(12) United States Patent
Bou-Diab et al.

(10) Patent No.: US 7,463,637 B2
(45) Date of Patent: Dec. 9, 2008

(54) PUBLIC AND PRIVATE NETWORK SERVICE MANAGEMENT SYSTEMS AND METHODS

(75) Inventors: Bashar Said Bou-Diab, Ottawa (CA); Laura Mihaela Serghi, Ottawa (CA); Brian McBride, Stittsville (CA)

(73) Assignee: Alcatel Lucent, Paris (FR)

( * ) Notice: Subject to any disclaimer, the term of this patent is extended or adjusted under 35 U.S.C. 154(b) by 616 days.

(21) Appl. No.: 11/105,601

(22) Filed: Apr. 14, 2005

(65) Prior Publication Data

US 2006/0233166 A1    Oct. 19, 2006

(51) Int. Cl.
*H04L 12/56* (2006.01)
(52) U.S. Cl. .................. 370/401; 370/352; 709/229; 726/1; 726/2
(58) Field of Classification Search .................. None
See application file for complete search history.

(56) References Cited

U.S. PATENT DOCUMENTS

| | | | |
|---|---|---|---|
| 2004/0078424 | A1 | 4/2004 | Yairi et al. |
| 2004/0103308 | A1* | 5/2004 | Paller .................. 713/201 |
| 2004/0111506 | A1* | 6/2004 | Kundu et al. ............. 709/223 |
| 2005/0240558 | A1* | 10/2005 | Gil et al. .................. 707/1 |
| 2006/0041636 | A1* | 2/2006 | Ballinger et al. ............ 709/218 |
| 2007/0124797 | A1* | 5/2007 | Gupta et al. .................. 726/1 |

FOREIGN PATENT DOCUMENTS

| WO | WO 03/091895 A2 | 11/2003 |
|---|---|---|
| WO | WO 03/091895 A3 | 11/2003 |

OTHER PUBLICATIONS

M. Hondo et al., "Securing Web Services", IBM Systems Journal, 2002, pp. 228-241, vol. 41, No. 2, IBM Corporation, Armonk, New York, United States of America.

* cited by examiner

*Primary Examiner*—Duc C Ho

(57) ABSTRACT

Public and private network service management systems and methods are disclosed. Rules for accessing a private services network in which network services are available are enforced so as to restrict access to the services network through a public network in accordance with policies of the services network. Use of network services by a client of the private services network through the public network is controlled according to network service access policies associated with the network services. Network services provided by clients of the services network which access the services network through a public network may also be offered to other clients of the services network through the services network and the public network.

25 Claims, 6 Drawing Sheets

PUBLIC AND PRIVATE NETWORK SERVICE MANAGEMENT SYSTEMS AND METHODS

CROSS-REFERENCE TO RELATED APPLICATIONS

The present application is related to co-pending and commonly assigned U.S. patent applications Ser. No. 11/105,732 entitled "NETWORK SERVICES INFRASTRUCTURE SYSTEMS AND METHODS", and Ser. No. 11/105,821 entitled "SYSTEMS AND METHODS FOR MANAGING NETWORK SERVICES BETWEEN PRIVATE NETWORKS", both filed of even date herewith. The entire contents of both of these co-pending applications are incorporated herein by reference.

FIELD OF THE INVENTION

This invention relates generally to network services and, in particular, to management of public and private network services.

BACKGROUND

Services for which information is distributed through a communication network are generally referred to as network services. So-called "web services" are an example of network services, and represent the next generation of web-based technology being used for automatically exchanging information between different applications over the public Internet network.

Web services are the framework for building distributed web-based applications over the Internet. Web services generally follow a Publish-Find-Bind communication model. In this model, a service description is published by the service provider into a registry, the service is found in the registry by potential service consumers, and a binding is made between a service consumer and the service based on the service description found in the registry. In the Web services context, web server resident applications are described using the standardized Web Services Description Language (WSDL), and published to a Services Registry using Universal Description, Discovery, and Integration (UDDI), and binding (service invocation) between service provider and consumer is made with Simple Object Access Protocol (SOAP).

A web service is an interface that describes a collection of operations that are network-accessible through standardized eXtensible Markup Language (XML) messaging. SOAP, a standardized messaging protocol, is typically used to access a web service. A web service performs a set of tasks that are described using a standard formal XML notation, called the service description. The service description of a web service includes the service location, the transport protocols that should be used to access the service, and the message formats and sequences the service expects when communicating with its consumer.

Web services provide a new way to distribute applications and data over the Web. Applications are built with pieces of code and data, web services, that may come from anywhere in the public Internet. An international order processing system may be built, for example, using one company's currency converter and another company's tracking system. Web services also enable different types of computer systems, having different hardware platforms, operating systems, and/or development platforms, to "speak" the same language. Current web services technology is in fact a collection of XML-based standards that provide for passing information between end-point applications, in the format of XML documents.

Web services have already proven themselves successful in the enterprise private network space, gaining rapid acceptance as the standard way for applications to communicate. Most current web services, however, are hosted by application servers which are located behind firewalls in corporate enterprise networks.

Efforts to support web services interactions within and beyond the enterprise space over the basic Internet infrastructure have concentrated on ad-hoc approaches. According to one approach, different enterprises between which web services were to be offered had to agree on using compatible applications, common proprietary software, custom interfaces and APIs, and common communication protocols. Enterprises also had to agree on data security and the way any secure communications were to be managed. In addition, each enterprise had to open their internal firewalls to let business traffic flow between applications in a point-to-point manner.

Adding new web services business partners in an enterprise environment has always been a difficult and time consuming process, since any potential new business partners tend to have different sets of rules and standards. Modifications to a new partner's applications and custom code revisions to the enterprise offering the new applications are often required.

There are currently no known management solutions for managing public and private network services in an extranet web service architecture, targeting a communication network provider's space as opposed to enterprise space. For example, although XML Virtual Private Network (VPN) devices exist, these devices are intended for implementation in enterprise networks behind firewalls. In the case of a communication network provider taking on the task of managing enterprise equipment, so as to offload from the enterprise the management of enterprise network services which are offered outside the enterprise, hardware problems with enterprise equipment would require corrective action by the network provider, which may become costly and time consuming.

Existing software-based security products which address the enterprise market do not scale to the requirements of the provider network edge, where a large number of enterprises with various policy/security/admission control requirements might wish to provide web services through the same network. Enterprise-class products, including server-based architectures and hardware XML devices, also do not typically satisfy the high availability and speed requirements of communication network provider edge equipment.

A network-based provider-managed Web services extranet service is desirable because it allows enterprises to offer and consume web services with minimal capital expenditures, minimal integration effort, and trusted service management. Enterprises need not construct the extranet service themselves, but use the operator's infrastructure and assistance for business-to-business transactions over the Web.

SUMMARY OF THE INVENTION

Embodiments of the present invention provide a new communication network element enabling a specific communication network service provider to manage public and private network services, illustratively web services.

In some embodiments, this new network element provides a gateway between a private extranet service network and the public Internet. The extranet network is in effect a "network of services" offered to a closed group of members while being administered by a network service provider. The extranet service model is preferably an application layer solution, an overlay network built on top of a network provider's infrastructure. At least some of the services offered within the extranet architecture are also made accessible through public communication networks.

According to an aspect of the invention, an apparatus for managing network services in a private services network includes a policy enforcement module configured to enforce rules for access to the private services network by a client of the services network through a public network in accordance with an authentication policy of the private services network, and to control use, by an authenticated client of the private services network, of a network service which is provided by another client of the private services network, in accordance with a network service access policy associated with the network service.

The apparatus may also include a services network interface configured to provide for communications between the public network and the private services network.

In some embodiments, the access policy is a service policy stored in a service policies registry of the private services network, a client policy stored in the public network gateway, and a services network policy stored in a registry of the private services network.

The policy enforcement module may be configured to determine the access policy associated with the network service by accessing, in a services registry of the private services network, information associated with network services available in the private services network.

According to one embodiment, the apparatus also includes a UDDI proxy module configured to apply the service access policy by controlling exposure of the network service through publication of information associated with the network service to a services registry accessible by the client.

An authenticated client may be allowed to make a network service which it provides available in the private services network. In this case, the UDDI proxy module may be further configured to identify a public network service available in the public network by accessing a public services registry of the public network, and to make the identified public network service available in the private services network by publishing information associated with the network service to a services registry of the private services network.

The policy enforcement module may also enforce other types of policy, such as a transform policy specifying respective formats for transfer of communication traffic in the services network and the public network.

In some embodiments, the apparatus includes one or more of: a forwarding/routing module operatively coupled to the policy enforcement module and configured to route communication traffic from the public network to the private services network, the forwarding/routing module supporting at least one of: a Layer1 forwarding method, a layer 2 forwarding method, Internet Protocol (IP) routing, and eXtensible Markup Language (XML) routing, a Simple Object Access Protocol (SOAP) proxy module operatively coupled to the policy enforcement module and configured to adapt service messages associated with network services between addressing schemes of the public network and the private services network, a service handling module configured to handle service messages, associated with network services, from both the private services network and the public network, a Universal Description, Discovery, and Integration (UDDI) proxy configured to mediate publishing of network service descriptions for network services available in the services network, to extract services policies from the network service descriptions for enforcement by the policy enforcement module, and to cache the network service descriptions, a data collector module for collecting logs of transactions between the services network and clients of the services network through the public network, a security module for providing secure communications services for the apparatus and to secure communications and provide security assertions in both the private services network and the public network.

The apparatus may be provided, for example, in a public network gateway through which clients of a services network may access the services network. A network controller may be operatively coupled to the public network gateway for managing policies enforced by the policy enforcement module and a registry of network services available in the services network. The network controller may be configured to provide to a public network gateway information associated with only those network services available in the services network having access policies which allow access to clients using a public network and the public network gateway to reach the services network.

One or more client gateways may also be provided in combination with a public network gateway and a network controller to provide an access point to the services network for other clients of the services network.

Another aspect of the invention provides an apparatus for managing policies associated with network services available in a private services network. The apparatus includes a gateway interface to be operatively coupled to a public network gateway through which a network service consumer client of the services network in a public network accesses the services network to use a network service provided by another client of the services network, and a policy manager operatively coupled to the gateway interface and configured to distribute network service policies specifying respective access controls for network services, provided by network service provider clients of the services network, to the public network gateway through the gateway interface to cause the public network gateway to control use of the network services by the network service consumer client in the public network in accordance with the network service policies.

The policy manager may also establish a client profile for the network service consumer client based on information provided by the client, which may be partially stored in a public network gateway and in the network controller for retrieval by the public network gateway during a client sign-on.

In some embodiments, a network service provider client of the services network in the public network accesses the services network through the public network gateway to make a network service available in the services network through the public network. The policy manager is further configured to establish a network service policy specifying access controls for the network service, based on information provided by the network service provider client and received through the gateway interface, and to distribute the service policy in the services network.

A client profile and service policies may be established for a single client of the services network. The profile may specify members of client relationship classes, and in this case the service policies for that client may specify network service access controls based on the client relationship classes.

The apparatus may also include a registries manager configured to maintain a registry of the network services available in the private services network. The registries manager may also receive from the public network gateway through the gateway interface information associated with a public network service provided by a network service provider in the public network, and to store the information in the registry of network services.

The apparatus may also include any or all of: a security manager operatively coupled to the gateway interface and configured to manage security of communications through the private services network, a registries manager operatively coupled to the gateway interface and configured to manage at least one of: a registry of network services available in the private services network, service timeout information, eXtensible Markup Language (XML) schemas, service contracts, Quality of Service (QoS) parameters, subscription information, addressing information, billing information, Service Level Agreement (SLA) monitoring information, transactional network service activity monitoring information, activity logs, performance auditing information, and exception alerts, and a system manager operatively coupled to the gateway interface and configured to receive and manage audit records captured by the public network gateway.

In one implementation, the apparatus is provided in a network controller of the services network, which may operate in conjunction with one or more public network gateways and possibly one or more client gateways A further aspect of the invention provides an apparatus for managing network services in a private services network, the apparatus including a policy enforcement module configured to enforce rules for access to the private services network by a client of the services network through a public network in accordance with an authentication policy of the private services network, and to allow an authenticated client to make a network service which it provides available in the private services network.

A method of managing network services of a private services network is also provided, and includes operations of identifying a network service, provided by a client of the private services network and available in the private services network, having an access policy which allows access to the network service by clients of the services network which connect to the services network over the public network, and making the identified network service available to a clients of the services network through the public network.

The method may also include authenticating a client of the services network over the public network, and allowing the authenticated client to offer, consume, or both offer and consume network services in the services network. The operation of allowing the authenticated client to offer and consume network services in the services network may include, respectively, publishing information associated with network services provided by the authenticated client from a services registry of the authenticated client to the services network, and publishing information associated with the identified network service from a services registry of the services network to the authenticated client over the public network.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
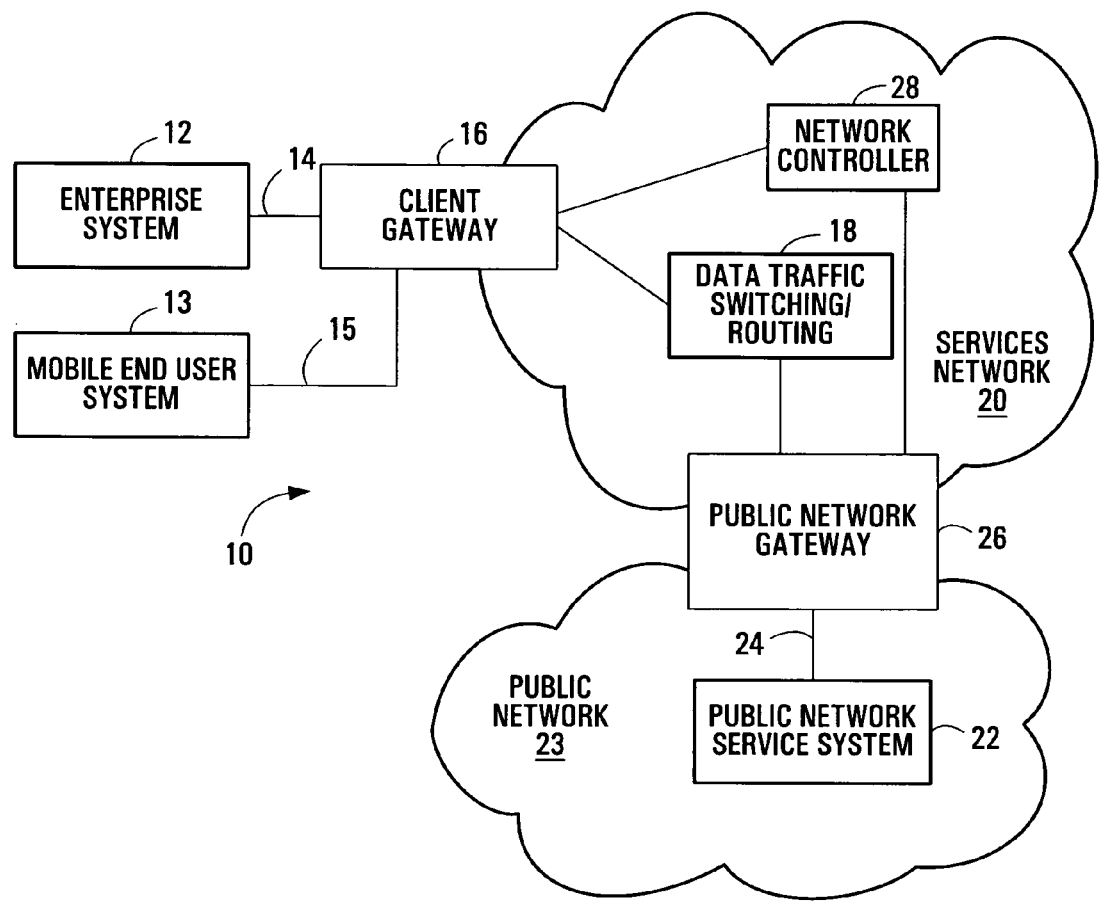
FIG. 1 is a block diagram of a communication system incorporating an embodiment of the invention.

FIG. 1 is a block diagram of a communication system incorporating an embodiment of the invention. The communication system 10 includes an enterprise system 12, a mobile end user system 13, a client gateway 16, a services network 20 which includes data traffic switching and routing components generally designated 18 and a network controller 28, a public communication network gateway 26, a public communication network 23, and a public network service system 22.

Although many enterprise systems 12 and/or end user systems such as the mobile end user system 13 can be connected to a client gateway 16, and also, many client gateways 16, public network gateways 26, and public network service systems 22 may reside at the border of the services network 20, only one example of each of these components has been shown in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The enterprise system 12 represents a private network which may provide, use, or both provide and use, web service applications, offered and managed throughout the services network 20. In a typical installation, an enterprise system includes such components as a firewall to provide external access control and filter external traffic entering the enterprise, traffic switching and routing equipment, one or more servers for supporting network services, and user terminals, illustratively personal computers. A corporate private network is one example of an enterprise system 12.

The mobile end user system 13 is illustrative of an client system which is not part of a specific enterprise system. End user systems may be mobile, as shown, or fixed. The mobile end user system 13 may be connected to the client gateway through a web services mobile gateway, for example. A mobile end user system 13, as well as fixed end user systems, may instead be physically connected to a client gateway 16. A portable computer system is mobile in the sense that it may connect to a client gateway through different locations and physical connections in an access network.

Those skilled in the art will be familiar with many different types of enterprise system and end user system which provide and/or use network services. Embodiments of the present invention relate primarily to managing private and public network services outside an enterprise environment, as opposed to how these services are actually supported in the enterprise system 12 or used in end user systems such as the mobile end user system 13, and accordingly the enterprise system 12, the mobile end user system 13, and their operation are described only briefly herein to the extent necessary to appreciate aspects of the invention.

A virtual extranet service portal, which may be implemented as a software application for instance, in the enterprise system 12 and the mobile end user system 13, allow end network service providers and consumers to interact with the services network 20. A service portal allows users to log into the services network and authenticate themselves with the services network by means of federated identity or another authentication scheme, and may also enable other additional capabilities such as displaying various services lists, descriptions, etc., without substantially affecting how an end user provides and/or consumes network services.

The connections 14, 15 may be direct connections as shown in FIG. 1, or indirect connections which traverse intermediate components and possibly other communication networks generally referred to herein as access networks. However, the present invention is not restricted to network connections, or any other particular type of connection, between the enterprise systems 12, the mobile end user system 13, and the client gateway 16. The connections 14, 15 may thus include any of direct, indirect, wired, and wireless connections.

Access to the services network 20 is provided for the enterprise system 12 and the mobile end user system 13 by the client gateway 16. The client gateway 16 is an edge device into the services network provider infrastructure, and represents a gateway into the virtual extranet service provided by the services network 20. The client gateway 16 is in essence a secure network service proxy appliance for implementing a web service gateway function, supporting proxies for network services and Web services XML "standards", for example, as well as new features. According to one embodiment, the client gateway 16 is a high-performance device implemented at least in part using hardware, and is configured for operation as disclosed herein with embedded software for deployment by a services network provider. An illustrative example of a client gateway 16 is described in detail below with reference to FIG. 2.

It will be apparent from the foregoing that several types of service provider are involved in the system 10. Network services are provided by one or both of the enterprise system 12 and the public network service system 22. The services network 20 and the public network 23 are provided by other service providers. A network service provider, for the enterprise system 12, thus offers network services, and a provider of the services network 20 provides, to a network service provider, another service which implements a network of services within which a network service provider may make its network service(s) available for use by network service consumers which are outside its own private system. A provider of the public network 23, an Internet Service Provider (ISP) for example, provides another service through which network services may be made accessible in the services network 20 and the public network 23.

A provider of a network service is referred to herein primarily as a network service provider, a provider of the services network 20 is referred to primarily as a services network provider, and a provider of a communication service in the public network 23 is referred to primarily as a public network provider. Thus, a network service provider provides one or more network services, a services network provider allows these network services to be offered externally, illustratively in a virtual extranet, and a public network provider allows network services to be accessed through a public network. In many implementations, it is expected that the services network provider will also own or operate the underlying communication network on which the services network is built, although this need not necessarily be the case in all embodiments of the invention. Similarly, a public network provider may or may not own and operate a communication network through which it provides communication services.

The network controller 28 provides control plane functionality of a service manager, and may be implemented as a network scale device, illustratively as a dedicated card for edge routers or a dedicated XML appliance, to be deployed by an operator of a communication network. It is used for managing the virtual extranet service, for hosting the central repository for all web services published within the virtual extranet, policies, service level agreements (SLAs), other network monitoring data, and to secure, manage, provision and store policies for end-to-end network services applications. The network controller 28, like the client gateway 16, is described in further detail below, by way of illustrative example with reference to FIG. 3.

Data traffic traverses the services network 20 through the data switching and/or routing equipment which is designated generally at 18. Whereas control/management traffic is handled by the network controller 28, data traffic is processed by the client gateway 16, and from there, by the switching/routing components 18.

The services network 20 may be implemented as a virtual extranet architecture. In one embodiment, the virtual extranet represents a virtual network built over a basic network infrastructure and an application-level overlay network over the virtual network, as a sort of private-managed services network which uses, for example, Internet technology and underlying Layer 1, 2, 3, and 4 technologies to securely share part of an enterprise's information or operations with multiple enterprises, including suppliers, vendors, partners, customers, or other businesses for instance. While the virtual network may provide for synchronous communication using IP routing within a separate routing plane on top of the physical network, the application level overlay may use application level routers for providing content-based publish-subscribe routing within that services network.

The virtual network of the services network 20 in this case represents a virtual network fabric which may be implemented using virtual IP routers and/or application level routers, illustratively XML router devices. The virtual network provides connectivity and mechanisms for synchronous communications, e.g. REQUEST/RESPONSE.

The application-level overlay in the virtual network of the services network 20 may be implemented using application level routers, such as XML routers. Application level routers communicate with each other and end clients at the application layer, but using underlying normal networking facilities. XML routers typically connect to each other with reliable point-to-point byte streams, such as Transmission Control Protocol (TCP), to implement reliable multicast. A primary function of the application-level overlay is to provide connectivity and asynchronous content delivery based subscribers interests, e.g. subscribe/publish.

Building the services network 20 as a virtual network with an overlay allows the services network 20 to be modified and deployed relatively easily in comparison with conventional private network service sharing techniques. An overlay services network is also an effective way to build a robust mesh that can effectively route XML packets.

Those skilled in the art to which the present invention pertains will be familiar with many different types of communication network on which a separate logical routing plane and an application layer network may be overlaid. The present invention is not in any way limited to implementation in conjunction with a services network having any particular type of underlying communication network.

The public network gateway 26 bridges the services network 20 and the public network 23. A primary purpose of the public network gateway 26 is to support interworking between network services of the services network 20 and the public network 23 while providing means for service logging, transaction auditing, customized service publishing, brokering of identity, endpoint authentication, endpoint authorization, endpoint accounting, service administration, access policy enforcement, content integrity and confidentiality, and customer application protection. The public network gateway 26 may thus be considered a service mediation and delivery point for both networks 20, 23. As disclosed in further detail herein, it may provide secure access to public network services hosted in the public network 23 by the public network service system 22 for clients of the services network 20, illustratively by publishing the public network services in services registries of the services network 20, in accordance with service and managerial policies. Access to network services hosted by clients of the services network 20 for privileged clients connecting to the services network over public network service systems such as 22, again in accordance with service policies, may also be provided by the public network gateway 26 in a manner similar to that provided by the client gateway 16 to directly connected clients.

The public network gateway 26 provides enterprises the specific, encompassing, and reliable protection needed for Web Services: against malformed messages and malicious content (XML, SOAP) at the company's domain boundary (firewall, DMZ), while in transit by means of encryption (Secure Sockets Layer (SSL) at transport level, XML Encryption and XML Digital Signature at field level for instance), and for Authentication, Authorization, and Audit (user, group, role, content based access control).

Like the client gateway 16, the public network gateway 26 may be a secure network service proxy appliance providing a web service gateway function, and may be implemented as a high-performance hardware-based edge device configured for operation as disclosed herein with embedded software for deployment by a services network provider. The public network gateway 26 is described by way of illustrative example below with reference to FIGS. 4 and 5.

The connection 24 may include any of direct, indirect, wired, and wireless connections, depending upon the type of the public network 23. One well known example of a public network is the Internet, in which the public network service system 22 would typically be connected to the public network gateway indirectly, through public network provider and public network core communication equipment. The present invention is not restricted to any specific type of public network or connection, many examples of which will be apparent to those skilled in the art.

The public network service system 22 is a public counterpart of the private enterprise system 12, and represents a network or system which may provide, use, or both provide and use, network services. Thus, the public network service system 22 may be substantially similar in structure to the enterprise system 12. Whereas the enterprise system 12 would normally strictly control access to its private network services to partners of the enterprise, however, network services provided by the public network service system 22 would usually be made more easily and widely accessible. As described above for the enterprise system 22, those skilled in the art will be familiar with many different types of system which provide and/or use network services, and accordingly the public network service system 22 is described only briefly herein.

In operation, the services network 20 enables network services provided by either the enterprise system 12 or the public network service system 22 to be made accessible to users connected to the services network 20 in a managed and secure manner and with a flexible application program interface. These users may include users in the enterprise system 12, other client enterprises or end users such as the mobile end user system 13 connected to the services network 20 through the client gateway 22 or another client gateway, or public network users connected to the services network 20 through a public network and a public network gateway, such as the public network 23 and the public network gateway 26, using Internet technology such as IP Security, Secure Socket Layer, or Transport Layer Security, etc. The service implemented by the services network 20 is supported by distinct types of network elements, the client gateway 16 and the public network gateway 26, which support communication protocols, and the network controller 28, which supports network, service, and client management functions.

The framework of the services network 20 may be divided into three areas, including communication protocols, service description, and service discovery. In one embodiment, the service network 20 uses existing standards and specifications which have been developed for each of these areas. The services network 20, however, manipulates web services Uniform Resource Identifiers (URIs) to force the web services transactions to occur over the web services network 20 and to force symmetric transaction paths through the client gateway 16 and the public network gateway 26 when multiples of them exist. The manipulation of the web services URI is further explained below.

For example, in the area of communication protocols, SOAP is one standard protocol which may be used to transport web services messages between a web client and a web server application, two service endpoints identified by respective URIs. SOAP is an extensible protocol that may provide for the transfer of additional information. For example, it is widely used to provide for transfer of additional information relating to content security mechanisms being used.

Web Services Description Language (WSDL) is an XML dictionary for describing a Web service, its functionality, specifications, inputs, outputs, and accessible methods. It is a standardized approach to network service description.

These web services protocols (SOAP and WSDL) provide the capabilities and messaging facilities to bind and execute functionality anywhere, on any platform, without the need for custom code.

One well known service discovery mechanism is Universal Description, Discovery, and Integration (UDDI). UDDI defines a standard mechanism for publishing and finding web services, and specifies how registries match WSDL-described service requirements with providers of those services. UDDI enables enterprises and applications to find web services over a services network or the Internet and allows operational registries to be maintained. UDDI lists web services from different companies, and gives their descriptions, location, services descriptions, associated access lists and security levels.

Other web services standards which are referred to herein and may be used in implementing embodiments of the invention include standards relating to addressing (WS-Addressing), reliable messaging (WS-Reliability), policy (WS-Policy), notification (WS-Notification) and identity scope management (WS-Trust and WS-Federation).

Although the above specifications and standards are well known, the use of these standards to manage private and public services in accordance with embodiments of the invention is not known.

As described briefly above, the client gateway 16 is a service delivery point for direct clients of the private extranet service provided by the services network 20. Public network clients access the services network 20 through public network gateways.

The client gateway 16 also provides secure access to the private extranet service, protecting both the provider of the service and the client, the enterprise system 12 and the mobile end user system 13 in FIG. 1.

Communications through the client gateway 16 and the services network 20 are preferably secure. Standards-based security techniques such as Transport Layer Security (TLS), Secure Socket Layer (SSL), WS-Security, XML-Encryption, and XML-Signature may be used to provide secure communications while leveraging existent enterprise ingress and egress certificates which would normally already have been established for the enterprise system 12. These standards-based techniques, as well as other techniques which will be apparent to those skilled in the art, ensure that authorized service consumers in the enterprise system 12 can participate in the virtual extranet services network 20.

The client gateway 16 also classifies and splits incoming communication traffic data into control traffic to be forwarded to the network controller 28 and data traffic to be forwarded towards a destination through the components 18 and possibly through another client gateway 16 or a public network gateway 26.

In general, a potential consumer of a network service such as a web service application, can only make use of a network service which is known to exist and has a valid service description. It is thus desirable for a network service provider to communicate the existence of a network service to potential consumers. This may be accomplished by publishing network services to registries, for instance. In the system 10 of FIG. 1, the client gateway 16 allows the enterprise system 12 to publish its internal network services to the services network 20. The client gateway 16 also allows the enterprise system 12 and the mobile end user system 13 to consume external network services provided by other members of the services network 20.

As disclosed in further detail herein, the extent to which the services provided by an enterprise system 12 are made available to other members of the services network 20 may be controlled by the client gateway 12 and the network controller 28.

Network service providers may thus publish internal network services to the services network 20 for use by other members of the services network 20. In many implementations, the services network 20 and the enterprise system 12 are expected to be secure private networks, and communications on the connections 14, 15 are also secure. This may be accomplished using secure tunnelling techniques, examples of which will be readily apparent to those skilled in the art. Secure communications at both access and network sides of the client gateway 16 provide a level of assurance that private network services available to members of the services network 20 are provided only by members of the services network 20 and can only be consumed by members of the services network 20 who are privileged to consume them according to the service access policy provided by the service provider along with the service description.

Since communications with the services network 20 by network service providers and consumers traverse the client gateway 16, the client gateway 16 may also capture comprehensive audit records which may be used locally and/or by the network controller 28 to maintain regulatory and policy compliance, for example. Audit records may also or instead be used by other components or systems, such as a billing system with microbilling capabilities for according service charges to consumers.

The network controller 28 provides the central control plane functions for the services network 20, and thus implements the functionality of a network services manager and a client manager. One main responsibility of maintaining a network services global repository. The network controller 28 may store non-volatile client and service profiles for use in establishing run-time client contexts, for example. Like the client gateway 16, the network controller 28 may be implemented as a high-performance hardware-based device with standard-based software for deployment by a services network provider. It is used for managing the virtual extranet service of the services network 20, to communicate to the client gateway 16 and the public network gateway 26 run-time service and client management and provisioning information regarding the distribution of service descriptions to clients and the enforcement of policies for end-to-end network services, and also to display and manage the list of available network services. While the network controller 28 is the services network management entity, the client gateway 16 and the public network gateway 26 enforce policies and security rules on the actual data. Data traffic traverses a provider's core network, as represented at 18 in FIG. 1, through the client gateway 16, and the network controller 28 processes control and management traffic.

The network controller 28 preferably implements at least a subset of core functions, including network services storage and management of information such as location, ownership, access level groups, service lists, and other basic characteristics of network services, central policy repository and rights management, security specifications, SLA requirements such as hard Quality of Service (QoS) requirements suitable for end business to end business transactions for instance, and additional repositories for things such as client profiles, transaction auditing services, logs, etc. It also maintains client profiles for use by run-time functions such as the federation of identity and brokering of trust with other service networks (not shown).

To be able to offer end-to-end transaction security, reliability of message transport, and identity management, network service providers and services network providers would normally have to meet on middle ground to offer one set of combined management functions. The network controller 28, in conjunction with the client gateway 16, may take the burden off the enterprise system 12 by replacing the enterprise's private management methods and tools with standard-based proxy modules offering the same functions at the edge of the services network 20.

The network controller 28 may also allow some security functions to be delegated to the extranet service, by freeing the local enterprise applications from providing certain security aspects like identity provider service, XML digital signature validation service, XML schema integrity, etc. By using the virtual extranet service, application integration within and between enterprises becomes easier and more efficient, end consumer business applications become more visible, and the costs and complexity associated with addition of partners to an enterprise system are reduced.

The network controller 28 uses client and service profiles that it stores to determine the services that should be made available to each client. The network controller 28 cooperates with the client gateway 16 and public network gateway 26 to make available to each client a customized subset of network services that the client is privileged to access from the set of services within the services network 20.

Network service management functions for public network services offered by the public network service system 22 are also provided by the network controller 28. Thus, in accordance with an aspect of the invention, the network controller 28 interacts with the public network gateway 26 and may perform any or all of the above network service management, central policy management, security, and transaction auditing functions, and possibly other functions, for the public network gateway 26.

Operation of the client gateway 16, the network controller 28, and the public network gateway 26 are described in further detail below with reference to FIGS. 2 through 5.

Figure 2:
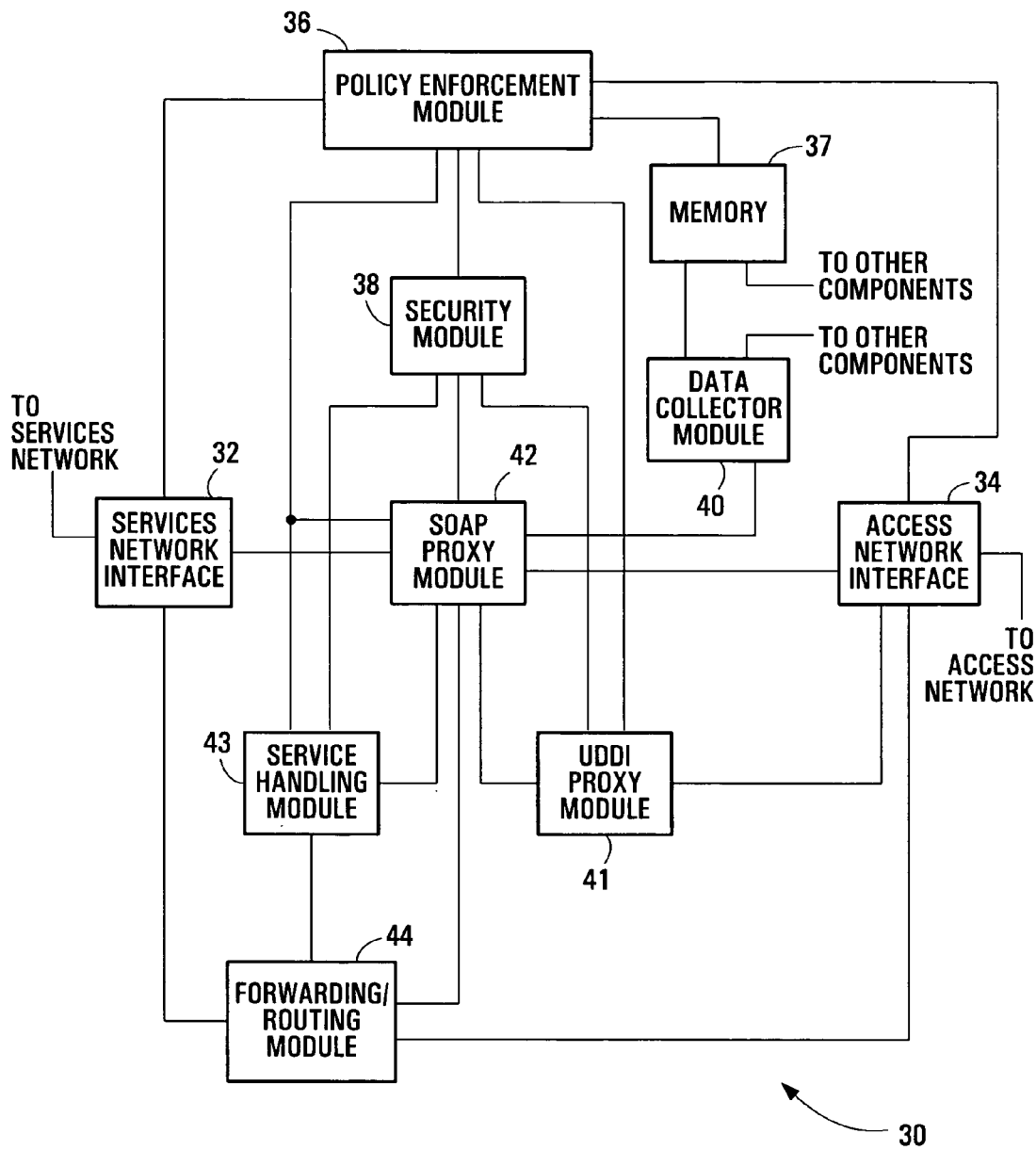
FIG. 2 is a block diagram of an example client gateway.

Considering first the client gateways 16, 26, FIG. 2 is a block diagram of an example client gateway. The client gateway 30 includes a services network interface 32, an access network interface 34, a policy enforcement module 36 operatively coupled to the interfaces 32, 34 and to a memory 37, a security module 38 operatively coupled to the policy enforcement module 36 and to the memory 37, a SOAP proxy module 42 operatively coupled to the interfaces 32, 34, to the policy enforcement module 36, to the security module 38, and to the memory 37, a data collector module 40 operatively coupled to the SOAP proxy module 42 and to the memory 37, a UDDI proxy module 41 which is operatively coupled to the policy enforcement module 36, to the security module 38, to the SOAP proxy module 42, and to the access network interface 34, a service handling module 43 operatively coupled to the policy enforcement module 36, to the security module 38, and to the SOAP proxy module 42, and a forwarding/routing module 44 operatively coupled to the services handling module 42, to the services network interface 32, and to the to the access network interface 34. Although such connections are not explicitly shown in FIG. 2 to avoid congestion, it should be appreciated that any or all of the other components of the client gateway 30 may be operatively coupled to the memory 37 and/or to the data collector module 40.

The access network interface 34 represents a remote access point through which the client gateway 30 connects to an enterprise system or other form of network service provider or consumer. Although labelled as an access network interface in FIG. 2, network service providers and consumers need not necessarily communicate with client gateways through network connections. It should therefore be understood that the interface 34 provides an interface to a member of a services network through an access connection, which may or may not strictly be a network connection.

The structure and operation of the access network interface 34 will be dependent upon the type of connection over which the client gateway 30 communicates with its client. In general, an access network interface 34 would include physical components which exchange communication signals with a communication medium, and hardware- and/or software-implemented components which generate and process the communication signals. Various implementations of such an interface will be apparent to those skilled in the art.

According to one embodiment, the access network interface 34 performs security tunnel termination for clients attempting to connect into services network 20 (FIG. 1). Virtual Local Area Network (VLAN), Point-to-Point Protocol (PPP), Multi-Protocol Label Switching (MPLS), and IP Security (IPSec) are all examples of protocols which may be used by the access network interface 34 to communicate with a client. Other protocols and communication schemes will be apparent to those skilled in the art.

The memory 37 may include one or more memory devices, such as solid state memory devices, for storing information. Other types of memory device, including memory devices for use in conjunction with movable and/or removable storage media, and multiple memory devices of different types, may also be provided as the memory 37. The type of memory device or devices implemented as the memory 37 in the client gateway 30 is a matter of design, and will be dependent upon the particular type of equipment in which the client gateway 30 is implemented. A circuit card for communication equipment, for example, would normally incorporate volatile and non-volatile solid state memory devices as the memory 37.

As will become apparent as the present description proceeds, the information stored in the memory 37 may be used by the functional components of the client gateway 30 in performing their respective functions. Any or all of the functional components 36, 38, 40, 41, 42, 43, 44 may access information stored in the memory 37. Similarly, although no connection between the memory 37 and the interfaces 32, 34 has been shown in FIG. 2 to avoid congestion, these interfaces or internal components thereof may also interact with the memory 37.

Some or all of the functional components 36, 38, 40, 41, 42, 43, 44, as well as internal functions or components of the interfaces 32, 34, may be implemented as software, which might also be stored in the memory 37.

The form of the internal connections between components of FIG. 2 would be dependent upon the particular type of equipment in which the client gateway 30 is implemented. Internal bus structures, for example, are often used in electronic devices, although other types of connection may be used in addition to or instead of an internal bus. It should also be appreciated that interconnections need not necessarily be via a physical medium, as in the case of software-based implementations for instance.

Functional components which implement services network functions of the client gateway 30 have been shown in somewhat more detail than access-side functions in FIG. 2, as embodiments of the invention relate primarily to functions which are performed on the services network side of the access network interface 34. For example, whereas the access network interface 34 provides security functions for access connections, a security module 38 which provides network-side security functions has been shown separately from the services network interface 32 in FIG. 2. Other network-side functional components have similarly been shown separately in FIG. 2 for illustrative purposes.

This representation of separate functional components in the client gateway 30 is not intended to limit the present invention. The network-side functions a client gateway may be implemented using further or fewer components than explicitly shown in FIG. 2, possibly with different interconnections. For example, functions of the policy enforcement module 36 could be incorporated into each component which applies policies. Security policies could be both managed and applied by the security module 38 for instance.

In software-based embodiments, functions may be implemented in respective software modules or combined into fewer software modules for execution by a single hardware component, namely a processor such as a microprocessor, an Application Specific Integrated Circuit (ASIC), a Digital Signal Processor (DSP), or a microcontroller. Software might instead be executed by multiple hardware components, a microprocessor and a DSP or a network processor plus several ASICs and FPGAs for instance. Combined implementations in which some functions are implemented in software and others are implemented in hardware, which tends to operate faster than software, are also contemplated.

Accordingly, functions may be divided or integrated in a different manner than shown in FIG. 2, and any of the functional modules described herein may be implemented in software, hardware, or some combination thereof.

The policy enforcement module 36 implements services network policy enforcement for network services as configured by services network clients in their client profiles and advertised in their services' descriptions to the network controller 28.

Policy assertions that specify traditional requirements and capabilities that will ultimately manifest on the wire, such as an authentication scheme required for a specific customer and/or transport protocol selection for instance, are implemented in the client gateway. Therefore, these policies assertions are downloaded from a network controller into client gateways and enforced by the policy enforcement module 36.

Authentication and authorization of network service providers and consumers, administration and verification of transactions involving network services, and ensuring privacy and integrity of communication traffic associated with network services are examples of functions which may be involved in enforcing policies by the policy enforcement module 36 in conjunction with other components. The policy enforcement module 36 may interact with the security module 38, for example, for authentication such as by verifying a message digital signature. Thus, enforcement of security policies may involve both the policy enforcement module 36, which manages the policies, and the security module 38, which actually applies the policies by authenticating clients and possibly passing or dropping communication traffic, for example.

It should therefore be appreciated that the policy enforcement module 36 need not itself actually apply the policies it manages for enforcement. Interaction between the policy enforcement module 36 and other components to apply policies to services network clients and transactions will be come apparent as the present description proceeds.

Through the policy enforcement module 36 at the client gateway 30, client authentication with the virtual extranet service is provided, rather than with each specific network web service as happens with current enterprise-centric network services. A network service consumer in a network service provider system with which the access network interface 34 communicates are clients of the client gateway 30, and gain access to network services across a services network through a single sign-on with the client gateway 30. The client gateway 30 thus removes the per-service authentication burden from its clients. Information to be used in client authentication is an example of one type of information which may be stored in the memory 37, preferably in a secure memory device or area.

For the case when a client XML digital signature is not present, the policy enforcement module 36 may cooperate with the security module 38 to generate a security assertion in accordance with what the end network service expects in terms of security assertions. The new security assertion is attached to service messages to assert the identity of the client and the integrity of the message.

When the client's identity "preference" is present but is different from the network service's "preference" the policy enforcement module 36 may cooperate with the security module 38 to map a specific digital certificate, illustratively an X.509 certificate into a different security assertion, such as a Security Assertion Markup Language (SAML) assertion.

Well known mechanisms drawn from standards such as SAML, WS-Federation, and WS-Trust are preferably used for these functions.

In one embodiment, the policy enforcement module 36 offers hardware implementation of federated identity, access control, and enforcement of policies that have been set up in advance using the network controller 28 (FIG. 1). Federated identity allows users to create and authenticate a user identity and then share the identity between domains and service providers without centrally storing personal information.

SLAs, tailored for we services operations, may also be in place for either or both of access-side and network-side communication links through which the client gateway 30 communicates with its clients and a services network. The policy enforcement module 36 may also monitor communication traffic levels to enforce SLA-related parameters, which may be stored in the memory 37.

As described briefly above, the virtual extranet services network according to an embodiment of the invention is XML-standard based, and accordingly the policy enforcement module 36, in conjunction with the service handling module 43 described below, may also enforce XML message header and message payload transformations for ingress data traffic received from clients of the client gateway 30, through the access network interface 34. Transformations may also be made from other message formats into XML-standard based network service messages. Inverse transformations, as well as transformations between non-XML formats used in access networks and services networks are also contemplated.

The security module 38 implements security standards to guarantee the security of communications over the services network. In some embodiments, the security module 38 uses web services standards-based tools such as WS-Security, XML-Encryption/Decryption, and XML-Signature to provide secure datapaths between services network members. These tools allow the client gateway 30 to leverage existent security protocols to ensure that authorized service consumers can participate in an end-to-end private business network. The security module 38 thus represents, in some embodiments, a central certificate and key management service for an enhanced over the core extranet service. The security module 38 provides security functions to all other modules of the client gateway 30, and specifically to the policy enforcement module 36, the UDDI proxy module 41, the SOAP proxy module 42, the service handling module 43, and both network interfaces 32, 34. These functions may include any or all of verification of signatures, encryption, decryption, signing, and exchanging of symmetric or asymmetric keys using protocols that are well known in the field of telecommunications security.

The SOAP proxy module 42 performs SOAP header handling for incoming and outgoing messages between clients and the services network. The SOAP proxy module 42 is a host that has two service addresses in two network interfaces: the access network 34 interface and the services network interface 32. As far as clients in the access network are concerned, all services advertised to the client by the services network appear to be offered from the SOAP proxy module 42.

Messages from either of the two connected networks are addressed to the SOAP proxy module 42, which receives SOAP messages, performs such functions and modifications as header handling, and relays the messages to the appropriate processing facility, the UDDI proxy module 41 or the services handling module 43. Also, messages from the UDDI proxy module 41 and the service handling module 43 are sent to the SOAP proxy module 42. Messages received from the UDDI proxy module 41 or the service handling module may be processed by the SOAP proxy module 42 to append Uniform Resource Identifier (URI) addressing information for instance. The SOAP proxy module 42 also interacts with the policy enforcement module 36 and the security module 38 to implement the network service policy on the outgoing message, and then sends the message on the appropriate interface. Policy enforcement, security, access control, auditing, and other functions associated with other modules of the client gateway 30 may thus be triggered by the SOAP proxy module 42 for each message.

To illustrate the operation of the SOAP proxy module 42, consider the following illustrative example: A service offered by one enterprise EB to another enterprise EA is proxied by the client gateway associated with EA to appear as if offered from a URI of the SOAP proxy module SPA of the client gateway. A service request from enterprise EA for a service offered by enterprise EB is sent to the SOAP proxy module SPA, which applies a set of functions and passes the message to the services handling module 43. Upon processing the service request, the services handling module 43 passes the message to the SOAP proxy module SPA, which appends the SOAP source and destination URIs SPA and SPB respectively, where SPB is the SOAP proxy module associated with the client gateway of enterprise EB. The request is then sent from SPA to SPB.

SOAP proxy module SPB further manipulates the SOAP source and address URIs of the message to SPB and EB before forwarding the request to enterprise EB. In the reverse direction, similar modifications are applied to the response. The SOAP URI is manipulated in such a way to store both the service URI and the SOAP proxy of the gateway associated with that service.

The SOAP proxy module 42 classifies and splits incoming traffic into UDDI control traffic to be forwarded to the UDDI proxy module 41 and data traffic, illustratively XML traffic, to be forwarded to the services handling module. Traffic classification may involve deep packet inspection, for example.

Although not explicitly shown in FIG. 2 to avoid congestion, a traffic classifier of the SOAP proxy module 42 may be operatively coupled to either the services network interface 32 or to another interface which supports communications with a network controller, to provide for exchange of control and/or management traffic with a network controller. It should also be appreciated that the SOAP proxy module 42 may receive control and/or management traffic from a network controller.

The UDDI proxy module 41 acts as an access point into a UDDI central repository hosted by the services extranet network, for all UDDI Publish requests received from clients trying to publish new web services or subscribe to published changes of existent web services, and as a proxy module, for all UDDI inquiry requests received from clients initiating 'find service' operations. Client access to network services is controlled, as disclosed herein, in accordance with network service policies. These policies may be enforced by the policy enforcement module 36 itself or in conjunction with the UDDI proxy module 41 to restrict the network services for which information is returned to a client system responsive to a find service or analogous operation.

The UDDI proxy module 41 expects ingress UDDI-based messages. All other messages that are not UDDI-framed may be discarded by the UDDI proxy module 41.

The UDDI proxy module 41 may cache UDDI entries locally at the client gateway level. This allows the UDDI proxy module 41 to perform local entry lookup and resolution when new UDDI inquiry requests are received. If a UDDI entry is locally found, then a UDDI response message is generated and sent back towards the client requesting the service.

If no UDDI entry is locally found, then a UDDI inquiry message is sent to the network controller, for a global look-up into the UDDI global repository. Once the entry is resolved by the network controller, a UDDI response is sent back to the same client gateway from where the request came. The client gateway 30 may learn and store the UDDI information for further UDDI lookups.

Thus, the UDDI proxy module 41 may handle local and remote resolution of service requests.

The service handling module 43 receives service messages from the SOAP proxy module 42, handles the service messages, and sends service messages to the SOAP proxy module 42. One primary function of the service handling module 43 is to process data traffic associated with a network service and being exchanged between the network service provider and consumer. In one embodiment, for example, service messages coming from the access network through the SOAP proxy module 42 are sent to the service handling module 43, which parses and modifies the messages to adapt them to the services network addressing and formatting rules. Formatting rules may be specified in a services network transform policy managed by the policy enforcement module 36, for example. The service handling module 43 then sends a corresponding service message to the client gateway associated with the network service provider through the SOAP proxy module and across the services network.

The forwarding/routing module 44 preferably performs preferably performs forwarding/routing decisions (Layer1 or Layer2 forwarding, IP and/or XML routing), towards destinations within the services. Although this module 44 may have the ability to handle IP traffic, complete with DNS lookups when necessary, as well as networking at the XML level, other embodiments may provide only one, different, or possibly additional routing mechanisms.

When application layer routing is provided, the basic functionality of the module 44 is to provide content-based routing for the service handling module 43. The service handling module 43 may use the forwarding/routing module 44 to identify SOAP endpoints for a published message. An example embodiment of the SOAP proxy module 42, the service handling module 43, and the forwarding/routing module 44 provides necessary mechanisms for publish-subscribe style networking.

An application routing layer of the forwarding/routing module 44 is optional and is best suited to support notification and event distribution type services. In one embodiment, the application routing layer stores client subscriptions in a subscription database, and upon reception of an XML multicast document that matches a set of entries in the subscription database, uses these entries to identify the next SOAP endpoints that require the document and forwards the document to those endpoints through the SOAP proxy module 42. The subscription for documents and publication of documents follow standardized mechanism outlined in the WS-Notification and WS-Eventing recommendations.

The services network interface 32 provides at least a physical interface to a services network. The type and structure of the services network interface 32, and other operations which may be performed on communication traffic which is exchanged with a services network, will be services network-dependent. Many examples of such network interfaces will be apparent to those skilled in the art.

The data collector module 40 gathers real-time management and billing information, which may be processed locally and/or forwarded to a network controller or other component for further storage and processing.

Once all operations are executed successfully at the policy enforcement module 36 and a security enforcement point in the security module 38, secure client identity and message integrity can be guaranteed within the services extranet network.

At this point, the data collector module 40 can pull real-time information for various management and billing operations. Data may be collected for activities like transaction auditing, performance auditing, event monitoring, transactional end-to-end business activity monitoring (transaction completion/failure), activity logs, SLA monitoring, warnings and errors thresholds, alerts, etc. The data collector 40 may collect information at any of various stages in a datapath, such as after the security module 38 to count packets discarded per security policy, at the policy enforcement level to compile statistics on discard policies, etc.

A client gateway such as shown in FIG. 2 may be configured to allow a network service provider to offer its services into a services network as local services, to allow a network service consumer to use network services which are available in the services network, or both. A client enterprise of the client gateway 30 may include both network service providers, in the form of enterprise application servers, and end user network service consumers.

When a client of the client gateway 30 has authenticated with the client gateway 30 and wishes to offer its network services into a services network, control traffic received from the client, illustratively through a secure tunnel terminated at the access network interface 34 or as encrypted and signed messages, is processed as described above, and forwarded to the network controller in the services network.

The level of availability of a network service in the services network may be determined on the basis of an explicit access control rules specified by the network service provider or the network controller. A network service provider might request that a network service remain private, for use only by consumers within its own private enterprise system. Although not accessible to other members of a services network, restricting access to a private network service in a services network would allow a network service provider to take advantage of other functions of a services network, including policy enforcement and registry hosting for instance. Semi-private network services are also envisioned, in which a network service provider specifies particular services network members or groups to which a network service is to be made available. An unrestricted network service is accessible to all members of a services network, and in accordance with an aspect of the invention, may or may not be offered to public network users accessing the services network 20 through a public network.

Predetermined network service access controls may instead be configured at a network controller and applied to network services according to a type or class of a network service or a provider of the network service. All network services from a particular network service provider might have the same predetermined access controls which are established when the network service provider first registers with the services network, for example. Each network service provider may instead have a set of relationship categories, such as partners, suppliers, customers, and so on. In this case, privilege of access to each service may be given to one category, for example, and denied for another one. Another possible predetermined access control regime would make network services of a group of network service providers which have an existing business relationship available within only that group. Public network services imported into the services network from a public network as disclosed herein would generally be available to all clients of the services network.

In a central policy management model, any access controls associated with a network service are stored as a service context or policy by the network controller. These policies are downloaded to each client gateway by the policy enforcement module 36 and applied to the data traffic as described above. Client contexts may be downloaded to the policy enforcement module 36 at run time to support mobility of the end user system 13 (FIG. 1) for instance.

Regardless of the particular access control scheme used to establish and manage access controls for network services, offered network services are made available within the services network in accordance with any access controls for each network service. This may be accomplished in several ways. As described above, control traffic is forwarded to and processed by a network controller in the services network. In this case, the network controller may publish information for the service in a registry which is accessible to client gateways in the services network. Each client gateway then controls access to registered network services by its clients in accordance with policies associated with the network services.

The present invention in no way limited to the above examples of network service access controls. Access controls need not necessarily be implemented at all within a services network. In some embodiments, all network services offered within a services network are automatically available to all members of the services network.

A network service provider can preferably also modify policies of a network service, to change access controls for instance, in a substantially similar manner by exchanging control traffic with a network controller.

Once a client service message has been authenticated by the policy enforcement module 36 and security module 42, the client message can also or instead access network services available in a services network through the client gateway 30. The particular network services which a client is able to access are controlled in accordance with policies managed by the policy enforcement module 36. A global registry of the services network might include registry entries for network services which are not available to every client, as specified in network service policies stored by a network controller and downloaded to the policy enforcement module 36. Only those network services to which a client of the client gateway 30 is allowed access are made available to the client.

Data traffic which is subsequently exchanged between a client of the client gateway 30 and a remote network service provider through the services network is processed substantially as described above. Traffic destined for the remote network service provider from the client is processed based on security policies by the security module 38, modified in the SOAP proxy module 42 and handled differently based on the XML message type in the service handling module 43, and finally the data traffic is routed to the remote network service provider, or actually to the client gateway to which the remote network service provider is connected, by the routing module 44 through the services network interface 32.

Substantially similar processing is applied to data traffic associated with a network service provided by a client of the client gateway 30. Data traffic received from a remote network service customer through the services network interface 32 is processed, modified, and classified and handled as data traffic by the security module 38, the SOAP proxy module 42, and the service handling module 43. Received data traffic is then forwarded to the client by the access network interface 34.

Figure 3:
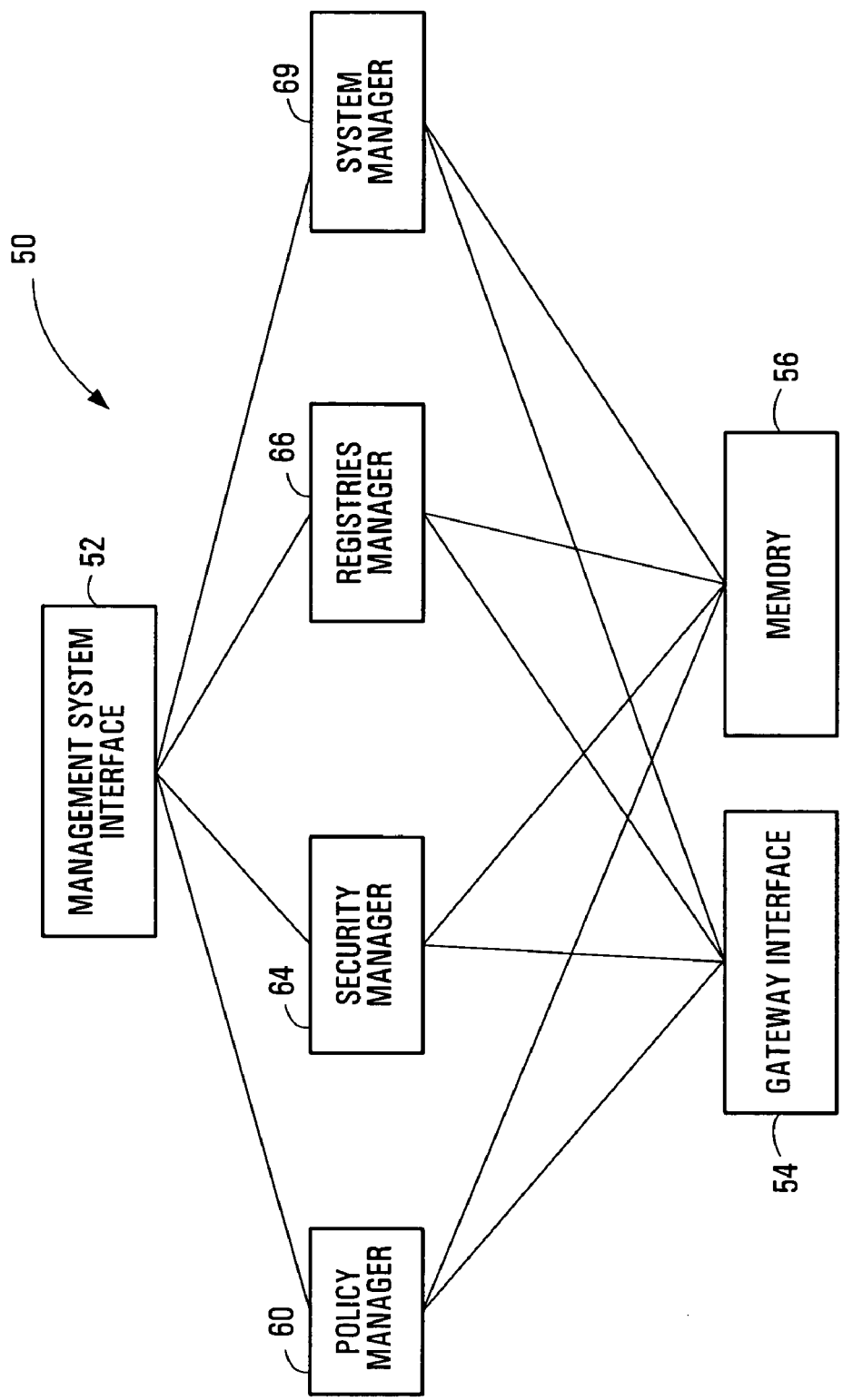
FIG. 3 is a block diagram of an example network controller.

Turning now to the network controller 28 (FIG. 1), FIG. 3 is a block diagram of an example network controller. The network controller 50 includes a management system interface 52, a gateway interface 54, and a memory 56 which are operatively coupled to managers 60, 64, 66, 69. The components of the network controller 50 may be provided in either a centralized architecture or a distributed and preferably centrally manageable architecture.

The management system interface 52 provides an interface to a management system, such as a Network Management System (NMS) for instance, which implements a central framework for configuration and management of a services network platform. The structure and operation of the management system interface 52 will be dependent upon the type of connection over which the network controller 50 communicates with its management system. In some embodiments, a network controller communicates with a management system through a managed communication network. Separate NMS management and control channels are also common. Examples of both types of management system interface, including interfaces using XML and interfaces which provide access to Management Information Bases (MIBs) for instance, will be apparent to those skilled in the art.

The gateway interface 54 represents an interface through which the network controller 50 communicates with client and public network gateways. Although shown as a single component in FIG. 3, the gateway interface 54 may include respective interfaces, and possibly different types of interface, for communication with multiple client gateways. As described above with reference to FIG. 2, control traffic may be exchanged between a client gateway and a network controller through the services network, using a services network interface, or some other type of interface. The gateway interface 54 of FIG. 3 thus represents an interface which is compatible with an interface, either the services network interface 32 (FIG. 2) or another interface, provided at client and public network gateways.

Like the interfaces described above with reference to FIG. 2, the management system interface 52 and the gateway interface 54 would generally include physical components which exchange communication signals with a communication medium, and hardware- and/or software-implemented components which generate and process the communication signals.

The memory 56 includes one or more memory devices for storing information. The information stored in the memory 56 may include information such as customer profiles and policies, security information, and access lists and access level groups per user per network service for use by components of the network controller 50, as well as registry information for access and use by other equipment in a services network. It should be appreciated, however, that the memory 56 may include both local and remote memory devices. Whereas network controller software is preferably stored locally, registries might be distributed and stored in remote memory devices which are accessible to both the network controller 50 and client and public network gateways to which network service consumers are connected.

Some or all of the managers 60, 64, 66, 69, and internal functions or components of the interfaces 52, 54, may be implemented as software. Software implementing these managers and functions might also be stored in the memory 56.

The policy manager 60 provides comprehensive policy provisioning, definition and security policy management capabilities. Policy management is centralized by the policy manager 60, although the policies pieces of content and data may be stored in a distributed manner throughout the services network. Policy components, such as the policy manager 60 and a registry in the memory 56 in which policy information is stored for instance, may be distributed. Also, policies information is downloaded into the policy enforcement modules in client gateways, as described above, and in public network gateways. By utilizing a centralized approach to policy management for network services, a single set of policies can be managed by delegated administrators, in the services network provider's infrastructure. The policy manager 60 may be configured to automatically download or push policy information to client and public network gateways, to transmit policy information responsive to requests from gateways, or support both push and pull policy information transfer mechanisms.

According to one embodiment, the policy manager 60 manages network service policies using a network service policies registry. The network services policies registry is a collection of network service policies which establish access controls for all network services offered within a services network. The policy registries may be part of a data registry that is used to store other information such as service description and client profiles.

Each individual network service policy may specify privacy parameters, such as the authentication information which must be presented in a message, whether a message has to be signed and/or encrypted, which parts of a message are to be signed and/or encrypted, and how messages or parts thereof are to be signed and/or encrypted. These functions may be provided by implementing existent web services standards, like WS-Security, WS-Policy, WS-PolicyAttachment, WS-PolicyAssertions and WS-SecurityPolicy. There may also be rules indicating the levels of access to specific network services, illustratively private, semi-private/group, and public at the virtual extranet level. There may also be SLA agreements and QoS requirements for the end-to-end services, and lists and details regarding business partners involved in specific business transactions.

For any new network services providers or consumers joining a services network, consumer profiles and policies are preferably created at registration time. As described above, a network service provider publishes its network services within a services network by sending control traffic to a network controller through a client gateway or a public network gateway. In accordance with an aspect of the invention, a network controller may also manage public network services, which may be consumed through a public network, as specified by public network service policies. In general, policies received from gateways through the gateway interface 54 or from a management system through the management system interface 52 are centrally managed by the policy manager 60 within the extranet service, but physically distributed within the virtual extranet provided by the services network.

Where a network service provider or consumer has its own service policies at the time of joining a services network, the policy manager 60 may allow the external service policies to be integrated into the services network's global policy registry. All management data at the extranet level may thereby be integrated with other data from enterprise management systems in order to create a globally-managed virtual extranet service.

The policy manager 60 also manages user authorizations and security profiles within the services network rather than with specific network service applications as is the typical scenario within an enterprise, and manages the authorization of the authenticated client endpoint. A network service consumer in the enterprise space, for example, connects to the services network through a client gateway and does a singlesign-on with the services network. The centralization of access control information into one registry entity hosted by the network controller avoids the problem of sharing identity information and access control policies between enterprise systems. Instead, this data is stored within the virtual extranet.

The policy manager 60 may also accommodate legacy authorization systems, illustratively by offering the data necessary for translating existent proprietary session cookies into SAML assertions and real-world identities that can then be mapped to other identity repositories.

The policy manager 60 may specify message header and message payload transformations to be applied to data traffic by client gateways. In some embodiments, transformations are made between XML-based web service messages and other formats of messages in accordance with information, illustratively XML schemas, stored in a registry.

The security manager 64 manages the security of communications through a services network. In one embodiment, the security manager 64 uses established network services and XML standards to guarantee secure communications. For example, a secure datapath created over the services network core may use WS-Security and XML-Encryption, as described above. Whereas gateways actually establish secure connections through a services network, the security manager 64 provides a central certificate and key management service for the services network. Security information is downloaded to gateways for use in establishing secure communications with other gateways through the services network. Like the policy manager 60, the security manager 64 may be configured to automatically download or push security information to gateways, to transmit security information responsive to requests from gateways at runtime when gateways require security information for network services transactions, or support both push and pull transfer mechanisms.

The registries manager 66 manages and sanitizes network service registries, illustratively industry standard registries such as UDDI, with advanced meta-data capabilities for network service location and management. The services network provider can store registry entries for available network services based on classification categories and branding they define, for example. In one embodiment, network services are organized in a registry according to permitted levels of access, which may include private, public, semi-private group, and/or others. As described above, some network services may be published privately to specific partners, while other network services are published publicly to the whole services network.

A network services registry managed by the registries manager 66 is a collection of network services from all network service providers connected directly or indirectly to a services network. For a new network service provider or consumer which does not have any registries capability at the time when it joins the services network, the registries manager 66 offers a full collections of network services, descriptions, locations, ownerships, and public APIs that allow a network service to be advertised and consumed. A network service provider may instead have its own registries at the time when it joins the services network, in which case the registries manager may allow the provider's network services to be published into the services network's global network service registry.

Other meta-data registries may also be available for storing network services information for purposes other than basic network service location and management. These may include registries for use by other network controller components to manage service aspects such as timeouts, XML schemas to be applied, service contracts, QoS parameters, and subscription and addressing information. Additional registries may store collections of data obtained as a result of storing billing information, SLA monitoring information, transactional end-to-end business activity monitoring information, activity logs and performance auditing information, and exception alerts, and also client profiles which include billing, preferences, partners, etc., for instance. User credentials, general policies and security policies may be stored in the registries as well.

In some embodiments, clients of a services network have real-time console-access and management tools for real-time monitoring and querying of all registry information, in accordance with their service policy.

The system manager 69 receives audit records captured by gateways to provide centralized control, monitoring, and auditing of transactions, events, warnings, and alerts, for instance, and may also manage delivery of comprehensive contracts and SLAs. Transaction priorities are preferably implemented based on their criticality. Other possible functions of the system manager 69 include reporting on transaction completions/failures and management of SLA contracts.

Figure 4:
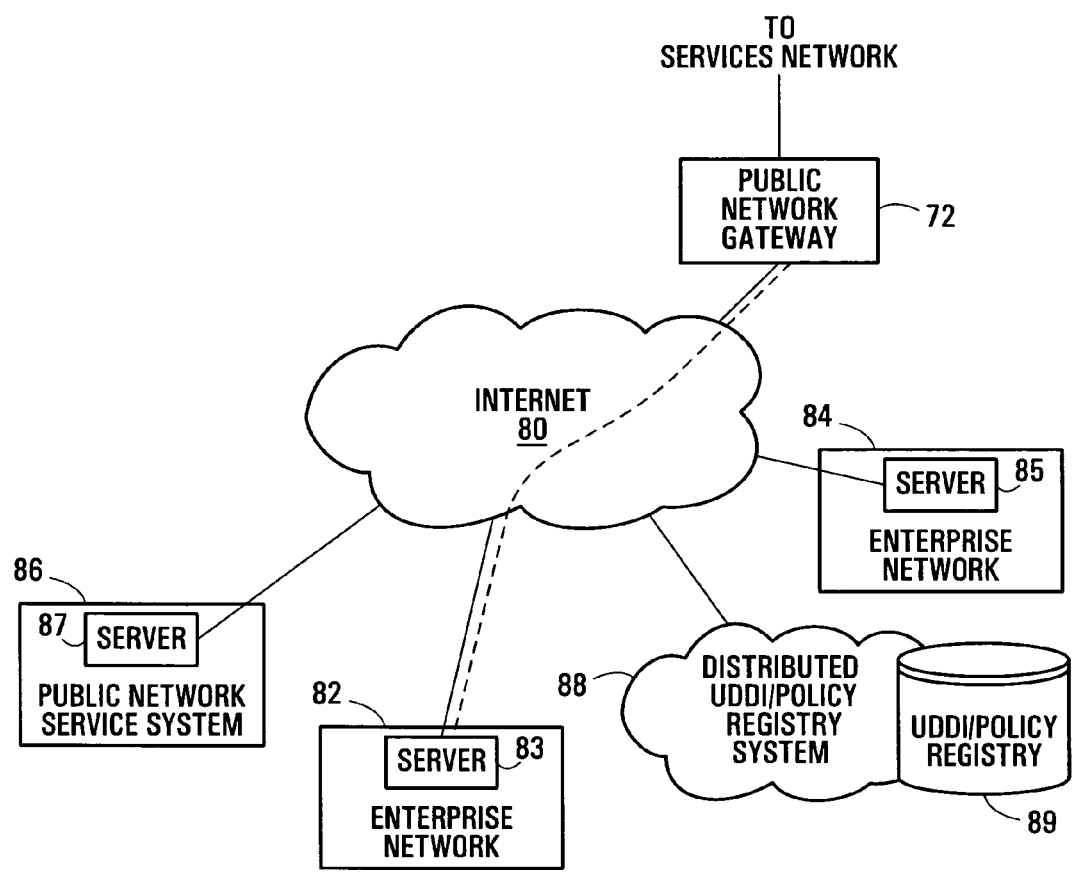
FIG. 4 is a block diagram of an Internet-based implementation of a public network gateway.

FIG. 4 is a block diagram of an Internet-based implementation of a public network gateway. The system of FIG. 4 includes a public network gateway 72, a public network service system 86 which includes a server 87, enterprise networks 82, 84 which include servers 83, 85, and a distributed UDDI/policy registry system 88 operatively coupled to a UDDI/policy registry 89 stored in a data store. These components are operatively coupled to, and may thus communicate with each other through, the Internet 80.

As described above, the structure and operation of the enterprise networks 82, 84 and the servers 83, 85, and also the public network service system 86 and the server 87, to provide network services are well understood. The public network service system 86 and its server 87 may operate in a conventional manner to provide public network services to consumers through the Internet 80. Although not explicitly shown in FIG. 4, it should be appreciated that network service consumers may be operatively coupled to the Internet 80 and make use of any public network services provided by the server 87. Network service consumers may also be part of the enterprise network systems 82, 84.

The enterprise systems 82, 84 would normally provide private network services internally within their respective enterprise spaces. According to an embodiment of the invention, a client, be it an enterprise network or a mobile computing device, may connect to the services network from the public Internet 80 through the public network gateway 72. In this example, the enterprise network 82, connected to the public network gateway 72 as shown by the dashed line, may have access to the services network using secure and authenticated communications terminated at the public network gateway 72. IPsec, Transport Layer Security (TLS, and SSL may be used to establish the secure authenticated tunnel to connect a client to the services network from a public network. Message based security techniques such as XML signatures and XML encryption may also be used to secure the communication between a client and the public network gateway 72. The level of authenticity and security, usually expressed in cipher strength and key length, may be used to determine the weather a network service from the services network may be accessible to the public client over the public Internet 80.

Other enterprise systems such as 84, which are not connected to public network gateway 72, may offer public services which are also to be made available in a services network and published to the registry 89 through the registry system 88. The distributed UDDI/policy registry system 88 and registry 89 may include a single system/registry installation or a plurality of public UDDI registry systems and registries. The UDDI proxy module of the public network gateway 72, described in further detail below with reference to FIG. 4, interworks with elements of the distributed UDDI/policy registry system 88 to obtain service descriptions of public network services available in the public Internet 80 and to make these services available in the services network by publishing them to the services network UDDI/policy registry. On the other hand, the public network gateway 72 preferably does not publish services that are available in the services network to the public Internet 80. The public network gateway 72 may publish network services that are accessible to a client connecting to the services network from the public Internet 80 to that client using secure messaging between the client and the public network gateway 72.

The public network gateway 72 is operatively coupled to both the Internet 80 and a services network. In one embodiment, the public network gateway 72 uses XML-standardized techniques for implementing and enforcing a secure XML datapath for network service traffic traversing multiple networks.

As described briefly above, the public network gateway 72 provides a gateway between a private network, illustratively an extranet service, and the public Internet 80. A channel of communication is implemented between public network gateway and an Internet client or Internet web server on the Internet 80. The channel created between the public network gateway 72 and an Internet device may use any or all of IPsec, SSL, TLS, WS-Security, XML-Encryption, XML-Signature, WS-Trust, and WS-Federation to ensure that only authorized network service client consumers can participate in services network while managing identity scopes with WS-Trust and WS-Federation.

Network services standards including UDDI, along with any or all of IPsec, SSL, TLS, WS-Security, XML-Signature, XML-Encryption, WS-Federation, and WS-Trust as noted above, may be implemented by the public service network gateway 72 to interwork publishing network services between the two networks, police service requests, and enable legitimate network service connections to authorized network services between the Internet 80 and a protected services network.

According to one embodiment, the public network gateway 72 is a SOAP-addressable point that cannot be circumvented during Internet to services network communications. Security of communications between the public network gateway 72 and the other systems of FIG. 2 may be provided, for example, via logical VPN tunnels through the Internet 80.

In respect of network service management, the public network gateway 72 preferably allows network service providers in a services network to publish internal network services to authorized enterprise clients in the enterprise system 82, for example, over the Internet 80 using secure communications. Network service providers in the services network use the public network gateway 72 to securely publish internal public network services to the UDDI registry of other service network members connecting to the services network through the public network gateway. In one embodiment, the public network gateway 72 offers implementation of federated identity, access control, and enforcement of policies, on all network layers, that have been all set up in advance. Policies may be drawn from network service descriptions, client profiles established with an retrieved from the network controller, and services network policies. The public network gateway 72 may also or instead allow network service consumer clients of the services network to consume private or public network services available on the Internet 80 through other registries.

The public network gateway 72 classifies and splits incoming data into control traffic that is processed in the public network gateway, possibly modified, and then forwarded to a network controller in the services network, and data traffic to be forwarded towards a destination in the services network, a client gateway to which a network service consumer is connected for instance.

The Internet 80 and the services network to which the public network gateway 72 is coupled will often use different routing domains, and accordingly the public network gateway 72 may terminate traffic from one domain before sending it on the other domain. The public network gateway 72, and specifically the SOAP proxy of the public network gateway is addressable from each domain using URIs. The public network gateway has the means of translating the URIs to valid addressable systems in each of the connected networks.

The public network gateway 72, and specifically a services handler module therein may perform URI translations where the Internet 80 and the services network use different naming service domains. For example, the public network gateway 72 may use DNS for IP routing toward the Internet 80 and either IP routing (with DNS) or other forms of name to network address binding systems.

All communications between the Internet 80 and a services network pass through the public network gateway 72. Thus, comprehensive audit records may be captured by the public network gateway 72 and forwarded to a network controller in the services network for use in maintaining regulatory and policy compliance for instance.

Figure 5:
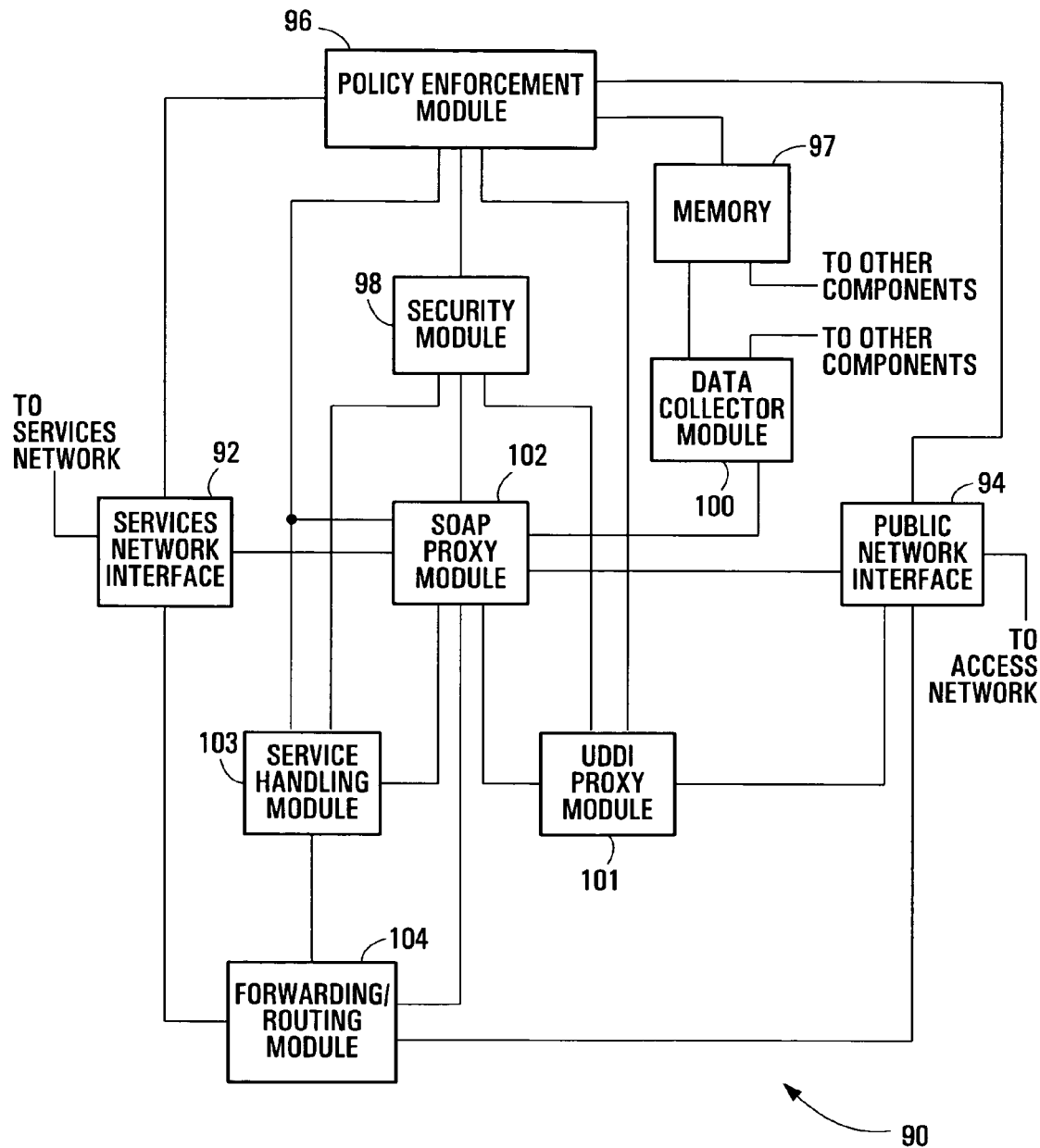
FIG. 5 is a block diagram of an example public network gateway.

The operation of a public network gateway, which may be an Internet gateway such as the gateway 72 or a gateway to a different type of public network, will become apparent from the following detailed description of FIG. 5, which is a block diagram of an example public network gateway.

The public network gateway 90 includes a services network interface 92, a public network interface 94, a policy enforcement module 96 operatively coupled to the interfaces 92, 94 and to a memory 97, a security module 98 operatively coupled to the policy enforcement module 96, a SOAP Proxy module 102 operatively coupled to the policy enforcement module 96, to the security module 98, and to the interfaces 92, 94, a data collector module 100 operatively coupled to the SOAP proxy module 102, and to the memory 97, a service handling module 103 operatively coupled to the policy enforcement module 96, to the security module 98, and to the SOAP proxy module 102, a UDDI proxy module 101 operatively coupled to the policy enforcement module 96, to the security module 98, to the SOAP proxy module 102, and to the public network interface 94, and a forwarding/routing module 104 operatively coupled to the SOAP proxy module 102, to the service handling module 103, and to the network interfaces 92,94. As noted above for the client gateway 30 of FIG. 2, other interconnections between the components of FIG. 5 may be provided in some embodiments, but have not been explicitly shown to avoid congestion.

It will be apparent from a comparison of FIGS. 2 and 5 that a client gateway and a public network gateway may have substantially similar structures, although these gateways operate somewhat differently.

As described above for the client gateway 30 (FIG. 2), the form of the internal connections between the gateway components of FIG. 5 would be dependent upon the particular type of equipment in which the public network gateway 90 is implemented. Internal bus structures and/or other types of connection may be used in the public network gateway 90.

In the public network gateway 90, the representation of separate functional components is not intended to limit the present invention. The services network-side functions a public network gateway may be implemented using further or fewer components than explicitly shown in FIG. 5, possibly with different interconnections. Accordingly, functions may be divided or integrated in a different manner than shown in FIG. 5. In software-based embodiments, for example, these functions may be implemented in respective software modules or combined into fewer software modules for execution by one or more processors. The functional components 96, 98, 100, 101, 102, 103, 104, as well as internal functions or components of the interfaces 92, 94, may thus be implemented as software stored in the memory 97, hardware, or partially in software and hardware.

The public network interface 94 connects the public network gateway 90 to a public network. In some embodiments, the public network interface 94 is an IP interface, although the structure and operation of the public network interface 94 will be dependent upon the type of connection over which the public network gateway 90 communicates with the public network. In general, the public network interface 94 would include physical components which exchange communication signals with a communication medium, and hardware- and/or software-implemented components which generate and process the communication signals. Various implementations of such an interface will be apparent to those skilled in the art.

For secure communications within the public network, the public network interface 94 may terminate secure VPN tunnels established through the public network. Other possible secure and non-secure communication protocols and schemes which may be used in a public network will be apparent to those skilled in the art.

The memory 97 may include one or more memory devices for storing information may be used by any or all of the functional components of the public network gateway 90, and thus the functional components 96, 98, 100, 101, 102, 103, 104 may access information stored in the memory 97. Although no connection between the memory 97 and the interfaces 92, 94 has been shown in FIG. 5 to avoid congestion, these interfaces or internal components thereof may also interact with the memory 97.

The policy enforcement module 96 implements services network policy enforcement for network services as configured by the network services members in their client profiles and advertised in their services' descriptions to the services network. Policy assertions that specify traditional requirements and capabilities, such as an authentication scheme required for a specific customer and/or transport protocol selection, are implemented in the public network gateway. Therefore, a set of these policies assertions are downloaded from a network controller into public network gateways when a client connects to the services network from the public network.

Authentication and authorization of network service providers and consumers, administration and verification of transactions involving network services, and privacy and integrity of communication traffic associated with network services are examples of functions which may be performed by the policy enforcement module 96, in conjunction with other functional components of the public network gateway 90, such as the security module 98. The policy enforcement module 96 may interact with the security module 98 for authentication by verifying a message digital signature for example, as described above for the client gateway 30.

Client authentication with the virtual extranet service is provided by the policy enforcement module 96 and the security module 98 for clients in a public network, rather than with each specific network web service as happens with current enterprise-centric network services. The public network gateway 90 allows clients connected to a public network to access the services network using a secure tunnel and single-sign-on mechanisms. The public network gateway 90 thus removes the per-service authentication burden from its clients. Information to be used in client authentication may be stored in the memory 97.

The operation of the policy enforcement module 96 in conjunction with the security module 98 to manage client authentication and authorization, as well as other functions of the policy enforcement module 96, will be apparent from the foregoing description of the substantially similar client gateway policy enforcement module 36 of FIG. 2.

The security module 98 implements security standards to guarantee the security of communications over the services network. In some embodiments, the security module 92 uses web services standards such as WS-Security, XML-Encryption/Decryption, and XML-Signature and transport security mechanisms such as IPsec, TLS, and SSL to provide secure datapaths between services network members. Technologies such as TLS, SSL, and IPsec are useful to provide secure communication tunnels between clients connected through the public network to the public network gateway 90. These tools allow the public network gateway 90 to leverage existent security protocols to ensure that authorized service consumers can participate in an end-to-end private business network. The security module 98 thus represents, in some embodiments, a certificate and key management service for an enhanced over the core extranet service. The security module 98 provides security functions to other functional modules as described above, the service handling module 103, and both network interfaces 92, 94. These functions may include verification of signatures, encryption, decryption, signing, exchanging of symmetric or asymmetric keys using protocols that are well known in the field of telecommunications security, such as Rivest-Shamir-Adleman (RSA) and Internet Key Exchange (IKE).

The data collector module 100 gathers real-time management and billing information, which may be processed locally and/or forwarded to a network controller or other component for further storage and processing. Once all operations are executed successfully at the policy enforcement module 96 and a security enforcement point in the security module 98, client identity and message integrity can be guaranteed within the services extranet network, and the data collector module 100 can pull real-time information from any or all of the modules shown in FIG. 5, at any of various stages in a datapath, for management and billing operations, substantially as described above for the client gateway data collector 40 (FIG. 2).

The SOAP proxy module 102, like the corresponding module 42 of the client gateway 30 (FIG. 2), performs SOAP header handling for incoming and outgoing messages between clients and the services network. The SOAP proxy module 102 is a host that has two service addresses in two network interfaces: the public network interface 94 and the services network interface 92. As far as clients connecting to a services network through the public network gateway 90 are concerned, all services advertised to the client by the services network appear to be offered from the SOAP proxy module 102.

Messages from either of the two connected networks are addressed to the SOAP proxy module 102, which receives SOAP messages, performs such functions and modifications as header handling, and relays the messages to the appropriate processing facility, the UDDI proxy module 101 or the services handling module 103. Messages from the UDDI proxy module 101 and the service handling module 103 are also sent to the SOAP proxy module 102. Messages received from the UDDI proxy module 101 or the service handling module 103 may be processed by the SOAP proxy module 102 to append URI addressing information for instance. The SOAP proxy module 102 also interacts with the policy enforcement module 96 and the security module 98 to implement the network service policy on messages and then sends the messages on the appropriate interface. Policy enforcement, security, access control, auditing, and other functions associated with other modules of the public network gateway 90 may thus be triggered by the SOAP proxy module 102 for each message.

Operation of the SOAP proxy module 102 may be substantially similar to that of the SOAP proxy module 42 of the client gateway 30 shown in FIG. 2, which has been described in detail above by way of illustrative example. As will be apparent, however, whereas the SOAP proxy module of a client gateway exchanges messages between a services network and an access network, the SOAP proxy module 102 performs substantially similar functions between the services network and a public network such as the Internet.

The SOAP proxy module 102 classifies and splits incoming traffic into UDDI control traffic and data traffic, using deep packet inspection, for example. UDDI control traffic is forwarded to the UDDI proxy module 101 and data traffic, illustratively XML traffic, is forwarded to the services handling module 103.

A traffic classifier of the SOAP proxy module 102 may be operatively coupled to either the services network interface 92 or to another interface which supports communications with a network controller, to provide for exchange of control and/or management traffic with a network controller. In FIG. 5, one possible form of this connection is shown through the UDDI proxy module 101, which is operatively coupled to the services network interface 92. It should also be appreciated that the SOAP proxy module 102 may receive control and/or management traffic from a network controller.

The UDDI proxy module 101 presents a UDDI interface to the public network and to services network clients of the services network in the public network from the services network and to the central UDDI repository of the network controller from the public network. The UDDI proxy module 101 passes to the network controller in the services network all services publications from the public network UDDI registries that conform to the services network policy for offering to the services network clients. The UDDI proxy module 101 may modify the service endpoints of a web service to force mediation of service interactions between public network services and service network services by the SOAP proxy 102. Also, the UDDI proxy module 101 presents a customized list of network services available in the services network to each services network client connected to the services network over the public network. The UDDI proxy module 101 preferably does not publish network services from the services network to public network registries.

The UDDI proxy module 101 acts as an access point into a UDDI central repository hosted by the services extranet network, for all UDDI Publish requests received from users accessing the services network through a public network to publish new web services or subscribe to published changes of existent web services, and as a proxy module, for all UDDI inquiry requests received from users initiating 'find service' operations.

The UDDI proxy module 101 expects ingress UDDI-based messages. All other messages that are not UDDI-framed may be discarded by the UDDI proxy module 101.

The UDDI proxy module 101 may cache UDDI entries locally, which allows the UDDI proxy module 101 to perform local entry lookup and resolution when new UDDI inquiry requests are received. If a UDDI entry is locally found, then a UDDI response message is generated and sent back towards the client requesting the service. Otherwise, a UDDI inquiry message is sent to the network controller, for a global look-up into the services network UDDI global repository. Once the entry is resolved by the network controller, a UDDI response is sent back to the same client gateway from where the request came. The public network gateway 90 may learn and store the UDDI information for further UDDI lookups. Thus, the UDDI proxy module 101, like the UDDI proxy module 41, may handle local and remote resolution of service requests.

Another function of the UDDI proxy module 101 is to prevent users in the public network that are not clients of the services network from finding network services in the services network.

The service handling module 103 receives service messages from the SOAP proxy module 102, handles the service messages, and sends service messages to the SOAP proxy module 102. One primary function of the service handling module 103 is to process data traffic associated with a network service and being exchanged between the network service provider and consumer. In one embodiment, service messages coming from the public network through the SOAP proxy module 102 are sent to the service handling module 103, which parses and modifies the messages to adapt them to the services network addressing and formatting rules. The service handling module 103 then sends a corresponding service message to the gateway associated with the network service provider through the SOAP proxy module 103 and across the services network.

Since the public network gateway 90 and the client gateway 30 (FIG. 2) have a presence in the same services network, the security module 98, the forwarding/routing module 104, and the services network interface 92 may be substantially similar to the corresponding components of the client gateway 30 (FIG. 2).

Security modules at communicating gateways provide communication security over a services network. Secure communications may thus be provided between client gateways, between public network gateways, or between a client gateway and a public network gateway.

The services network interface 92 provides at least a physical interface to a services network, and is compatible with services network interfaces provided at other gateways in a services network. The type and structure of the services network interface 92, and other operations which may be performed on communication traffic which is exchanged with a services network, will be services network-dependent, and many examples of such network interfaces will be apparent to those skilled in the art.

A public network gateway such as shown in FIG. 5 may be configured to allow network service provider clients of a services network to access network services available in a services network through a public network such as the Internet, to allow network service providers in a public network to offer their services into a private services network, or both. Communication traffic is also transferred between the services network and the public network by the public network gateway.

Operation of a public network gateway may be best illustrated by considering various network service offering and use scenarios.

Through a public network gateway, a network service provided by a network service provider client of a services network may also be made available to clients of the services network through a public network. The network service provider controls availability of its network services, as described above, by establishing access control policies when publishing the network service to the services network global registry, for instance.

Public network gateways restrict access to network services from the services network to clients of the services network that may connect from the public network. The public network gateway denies access to network services from the services network to non-member hosts on the public network.

Public network gateways are also responsible for publishing network services provided by public network clients of the services network into the services network registry, so as to provide for inter-network service offerings and inter-registry publishing from a public network into a services network. In this case, public network services provided by network service providers in a public network are made available in the services network by exchanging control traffic with the network controller of the services network. Network service provider-specific policies may be of particular significance for network services provided by network service providers in a public network. Network services which are imported from a public network are public network services and thus would normally be made accessible to all network service consumer clients of the services network. However, it is contemplated that policies may be specified for public network services in some embodiments.

Publishing of public network services into a services network by a public network gateway may be handled by the public network gateway automatically, by identifying network services in public registries which are provided by clients of the services network, or responsive to explicit service publication requests received from public network-based clients of the services network. Publication in response to requests may be accomplished by a public network gateway substantially as described above for a client gateway.

In a preferred central policy management model, access controls associated with network services are stored as service contexts or policies by the network controller, and downloaded to each client gateway and public network gateway for enforcement.

Public network services may thus be offered by network service providers either or both of a client gateway and a public network gateway. Several network service consumer scenarios are also possible.

A network service consumer client of the services network who is also a client of the public network authenticates with a public network gateway and establishes a secure communication channel for accessing network services in the services network. The particular network services which a client is able to access are controlled by the policy enforcement module in accordance with policies established for the network services. Embodiments of the invention also allow services network clients to access public network services provided by network service providers in an external public network. Data traffic which is subsequently exchanged between a network service consumer client and a remote public network service provider through the services network and the public network is processed by the public network gateway.

With reference to FIG. 5, traffic destined from a public network service provider to a network service consumer client of the services network is classified as data traffic by the SOAP proxy module 102, and processed by the SOAP proxy module 102 in collaboration with the security module 98. A resultant service message is handled by the service handling module 103, which modifies the message, the security module 98 performs security processing to apply XML-level security for example on the modified message, and the message is routed to the network service consumer client, or actually to the client gateway to which the network service consumer client is connected, by the forwarding/routing module 104 through the services network interface 92.

Data traffic destined for a public network service provider is processed in a substantially similar manner by the public network gateway 90. Data traffic received from a remote network service consumer client of the services network through the services network interface 92 is classified as data traffic by the SOAP proxy module 102. For data traffic received on a secure connection, security processing is performed by the security module 98. Received data traffic destined for the public network is also processed by the services handling module 103, which modifies the message for adaptation to the public network. The message is then passed to the SOAP proxy module 102, which appends public network addressing information that is routable in the public network, and then the message is secured by the security module 98, which initiates a secure communication channel with the public network service provider. The message is then forwarded to the public network service provider through the public network by the public network interface 94.

Although public network services which are provided by network service providers located in a public network are normally accessible to any network service consumer which can communicate with the network service provider, the services network is a private network. The public network gateway allows clients connecting from the public network to consume services offered within the services network, but it does not allow public servers that are not clients of the services network to consume services within the services network. Once a client from the public network is authenticated with a public network gateway and authorized for access to the services network, the client has access to public network services and network services offered to the client by the client's partners available in the services network. Authentication with a public network gateway effectively authenticates a network service consumer with the services network, and no additional authentication with a network service provider client is necessary.

It should be noted that the policy enforcement module of a public network gateway may enforce any or all of services network policies, network service policies, and client policies. Some of these policies may be centrally managed by and downloaded from a network controller. The policy enforcement module enforces restrictions on public network service consumer access to network services offered in the services network by clients or by other networks. Only clients of the services network may access network services from the services network through a public network gateway.

As described above, a services network is a private, protected network. In order to maintain a level of control over the public network services which are accessible in the services network, a public network gateway may also be configured to authenticate network service providers in a public network before their network services are made available in the services network.

Auditing of network service-related transactions by a public network gateway may be useful for billing consumers for use of public network services, whether the consumers are services network clients or located in a public network. Although services network clients may already have an established business relationship, there would not typically be any existing relationship between a network service consumer client of the services network and a network service provider in the public network. Authentication of a public network-based provider and auditing of any subsequent transactions with the services network might thus be particularly important where a public service provided by a consumer in a public network is used by a services network client. Authentication of the provider ensures proper identification of the network service provider, and auditing allows tracking and billing of that provider's activities. As noted above, audit records may also or instead be used by a gateway, a network controller, or another system for other purposes than billing.

Figure 6:
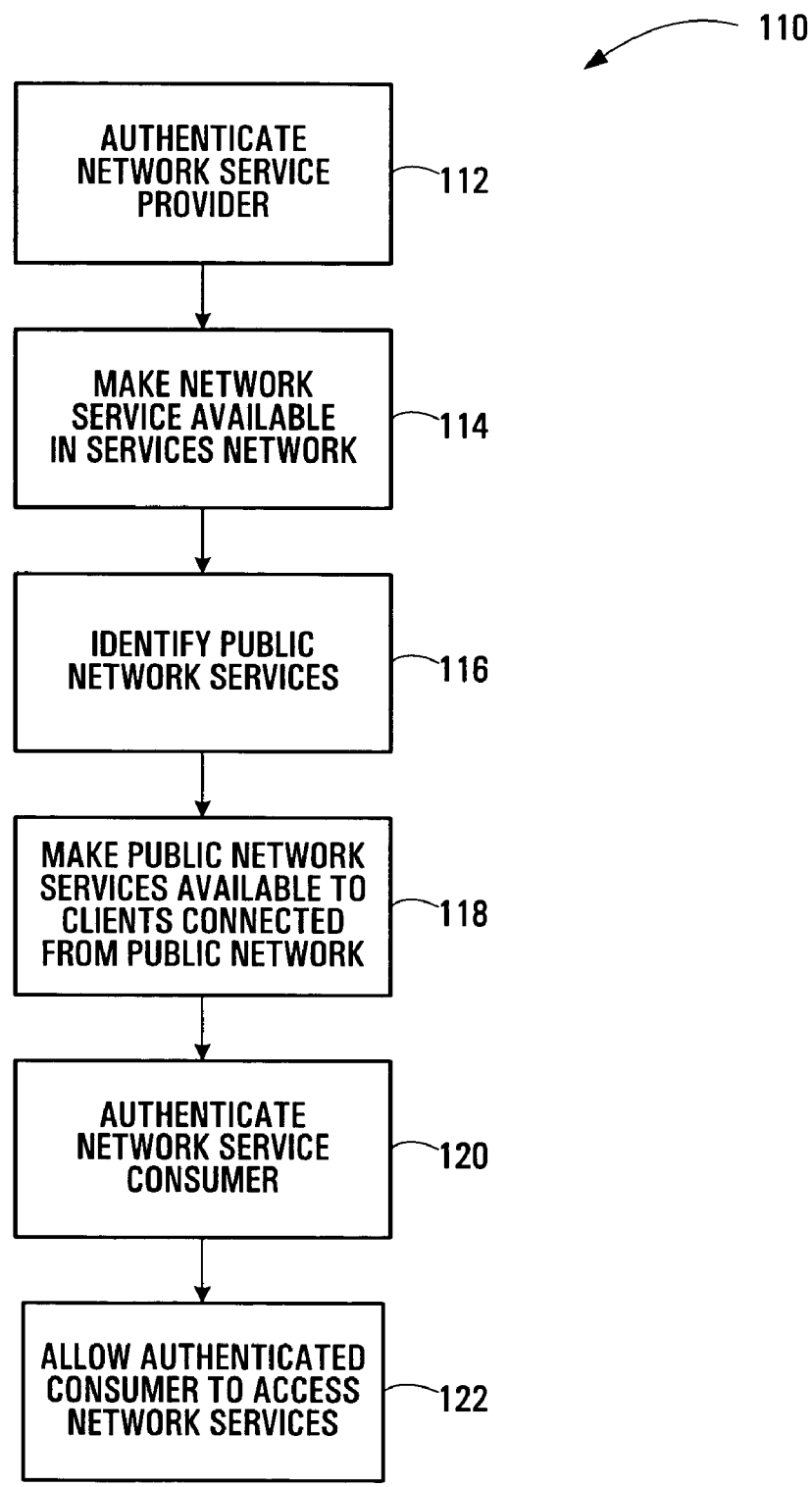
FIG. 6 is a flow diagram of a method according to an embodiment of the invention.

Embodiments of the invention have been described above primarily in terms of communication network equipment, namely the client gateway, the network controller, and the public network gateway. FIG. 6 is a flow diagram of a method according to an embodiment of the invention.

The method 110 begins at 112 with an operation of authenticating a client of a services network, in this case a network service provider. When the network service provider has been authenticated, a network service provided by the network service provider is made available in the services network at 114.

As network services are made available in the services network at 114, public network services are identified at 116 on the basis of their policies and made available to clients connected from a public network at 118. The operations at 116 and 118 may be performed for each network service as it is added to the services network, at predetermined intervals or times of day, or responsive to explicit requests by a network service provider or consumer clients of the services network. In one embodiment, a public network gateway determines the access control policy of each network service when it is first registered in the services network, and may publish each network service to a client registry in accordance with its policy. Those skilled in the art will appreciate that XML routing within the services network may be useful for distributing event notifications, to alert public network gateways when a new network service has been registered for instance or for supporting document distribution services.

A network service consumer authenticated with a client gateway or a public network gateway at 120 may be allowed to access the services network at 122 to use network services.

The method 110 as shown in FIG. 6 is intended solely for illustrative purposes, and represents the situation of offering network services provided by clients of a services network to clients connected to the services network from a public network. Public network services provided by network service providers in a public network may also or instead be made available in a services network in a substantially similar manner. At 118, for example, public network services from a public registry may be made available in the services network. Thus, more generally, an authenticated client of a services network may be allowed to make a network service available within a services network or to use a network service which is provided by another client of the services network or a network service provider located in a public network. The same client might thus be authenticated only once and subsequently allowed to perform multiple network service-related functions. An authenticated network service client consumer in a public network may similarly be allowed to use network services offered by other clients of the services network.

Various manners of performing the operations shown in FIG. 6, as well as other operations which may be performed, will be apparent from the foregoing.

What has been described is merely illustrative of the application of principles of the invention. Other arrangements and methods can be implemented by those skilled in the art without departing from the scope of the present invention.

For example, a services network may include components other than those shown in FIG. 1, such as service network gateways disclosed in the related application Ser. No. 11/105,732, referenced above.

A services network may also include multiple network controllers. Different gateways may be connected to different network controllers. It may be desirable to configure one network controller as a designated network controller for some operations of the services network, such as maintaining a central services registry and communicating with services network gateways. A designated network controller might be the same as an ordinary network controller, but configured as a network controller through a command line interface (CLI) of an operator terminal through a management system interface 52 (FIG. 3), for example.

Where network services registries are maintained in multiple network controllers within one services network, the network controllers preferably communicate among themselves for exchanging control information about the services contained in each of their registries and about these services' local storage.

Therefore, a network controller may store into its registries information which has been provided to it by gateways and possibly other network controllers.

The example gateways and network controller components shown in FIGS. 2 through 5 are similarly not restrictive. Embodiments of the invention may include fewer or additional components. A management system which communicates with a network controller may also communicate with gateways for instance, even though no management system interface was shown in the example gateways 30 and 90 of FIGS. 2 and 5 to avoid congestion.

Services network clients have been described primarily herein as enterprise clients, but need not necessarily be associated with an enterprise. Embodiments of the invention may be implemented in conjunction with non-enterprise services network clients.

The present invention is also in no way restricted to any particular division of functions between gateways and a network controller. Functions may be distributed or integrated in a different manner than explicitly described herein. Registries, for example, could be stored by each client gateway instead of centrally.

Gateways and other components may also perform further functions than those explicitly described above. For instance, a public network gateway may allow mobile agents of a client enterprise access to services in a services network over secure tunnels in the public network.

Embodiments of the invention are also independent of any particular registry format or content. In many cases, addresses or locations of network service provider clients of a services network are routable within the services network only, and accordingly these addresses or locations may be stored within services network registry(s). Public network addresses or locations are routable in the public network and are stored in the services description in registry entries in a services network global registry for public network services provided by public network-based providers. The SOAP proxy module of the public network gateway interworks the two addressing networks and allows communication between a public network service provider and a services network consumer. In addition, although described primarily in the context of methods and systems, other implementations of the invention are also contemplated, as instructions stored on a machine-readable medium for instance.

We claim:

1. An apparatus for managing network services in a private services network, the private services network being accessible through a public network, the apparatus comprising:
   a services network interface configured to provide for communications between the public network and the private services network; and
   a policy enforcement module configured to enforce rules for access to the private services network by a client of the services network through the public network in accordance with an authentication policy of the private services network, and to control use, by an authenticated client of the private services network, of a network service which is provided by another client of the private services network, in accordance with a service access policy associated with the network service.

2. The apparatus of claim 1, wherein the access policy comprises a service policy stored in a service policies registry of the private services network, a client policy stored in the public network gateway, and a services network policy stored in a registry of the private services network.

3. The apparatus of claim 1, wherein the policy enforcement module is configured to determine the access policy associated with the network service by accessing, in a services registry of the private services network, information associated with network services available in the private services network.

4. The apparatus of claim 1, further comprising:
   a Universal Description, Discovery, and Integration (UDDI) proxy module configured to apply the service access policy by controlling exposure of the network service through publication of information associated with the network service to a services registry accessible by the client.

5. The apparatus of claim 4, wherein the policy enforcement module is further configured to allow the authenticated client to make a network service which it provides available in the private services network, and wherein the UDDI proxy module is further configured to identify a public network service available in the public network by accessing a public services registry of the public network, and to make the identified public network service available in the private services network by publishing information associated with the network service to a services registry of the private services network.

6. The apparatus of claim 1, wherein the policy enforcement module is further configured to allow the authenticated client to make a network service which it provides available in the private services network.

7. The apparatus of claim 1, wherein the policy enforcement module is further configured to enforce a transform policy of the services network, the transform policy specifying respective formats for transfer of communication traffic in the services network and the public network.

8. The apparatus of claim 1, further comprising at least one of:
   a forwarding/routing module configured to route communication traffic from the public network to the private services network, the forwarding/routing module supporting at least one of: a Layer 1 forwarding method, a layer 2 forwarding method, Internet Protocol (IP) routing, and extensible Markup Language (XML) routing;
   a Simple Object Access Protocol (SOAP) proxy module configured to adapt service messages associated with network services between addressing schemes of the public network and the private services network;
   a service handling module configured to handle service messages, associated with network services, from both the private services network and the public network;
   a Universal Description, Discovery, and Integration (UDDI) proxy configured to mediate publishing of network service descriptions for network services available in the services network, to extract services policies from the network service descriptions for enforcement by the policy enforcement module, and to cache the network service descriptions;
   a data collector module for collecting logs of transactions between the services network and clients of the services network through the public network; and
   a security module for providing secure communications services for the apparatus and to secure communications and provide security assertions in both the private services network and the public network.

9. A system for managing network services in a private services network, the system comprising:
   at least one public network gateway operatively coupled to the services network and to a respective public network, each of the at least one public network gateway comprising the apparatus of claim 1; and
   a network controller operatively coupled to the at least one public network gateway for managing policies enforced by the policy enforcement module and a registry of network services available in the services network.

10. The system of claim 9, wherein the network controller is configured to provide to each public network gateway information associated with only those network services available in the services network having access policies which allow access to clients using respective public networks to reach the services network.

11. The system of claim 9, further comprising:
   a client gateway operatively coupled to the services network for providing an access point to the services network for a respective group of services network clients.

12. An apparatus for distributing policies associated with network services available in a private services network, the apparatus comprising:
   a gateway interface to be operatively coupled to a public network gateway through which a network service consumer client of the services network in a public network accesses the services network to use a network service provided by another client of the services network; and
   a policy manager operatively coupled to the gateway interface and configured to distribute network service policies specifying respective access controls for network services, provided by network service provider clients of the services network, to the public network gateway through the gateway interface to cause the public network gateway to control use of the network services by the network service consumer client in the public network in accordance with the network service policies.

13. The apparatus of claim 12, wherein the policy manager is further configured to establish a client policy from a client profile for the network service consumer client based on information provided by the client during membership initiation with the services network.

14. The apparatus of claim 12, wherein a network service provider client of the services network in the public network accesses the services network through the public network gateway to make a network service available in the services network through the public network, and wherein the policy manager is further configured to establish a network service policy specifying access controls for the network service, based on information provided by the network service provider client and received through the gateway interface, and to distribute the service policy in the services network.

15. The apparatus of claim 14, wherein the policy manager is further configured to establish a client profile for the network service provider client based on information provided by the network service provider client, the client profile specifying members of client relationship classes, and wherein the network service policy for the network service provided by the network service provider client specifies the access controls based on the client relationship classes.

16. The apparatus of claim 12, wherein the network service policies comprise network service policies stored in a network service policies registry maintained by the policy manager.

17. The apparatus of claim 12, further comprising:
a registries manager configured to maintain a registry of the network services available in the private services network.

18. The apparatus of claim 17, wherein the registries manager is further configured to receive from the public network gateway through the gateway interface information associated with a public network service provided by a network service provider in the public network, and to store the information in the registry of network services.

19. The apparatus of claim 12, further comprising at least one of:
a security manager operatively coupled to the gateway interface and configured to manage security of communications through the private services network;
a registries manager operatively coupled to the gateway interface and configured to manage at least one of: a registry of network services available in the private services network, service timeout information, extensible Markup Language (XML) schemas, service contracts, Quality of Service (QoS) parameters, subscription information, addressing information, billing information, Service Level Agreement (SLA) monitoring information, transactional network service activity monitoring information, activity logs, performance auditing information, and exception alerts; and
a system manager operatively coupled to the gateway interface and configured to receive and manage audit records captured by the public network gateway.

20. A system for managing a private services network in which network services provided by network service providers are made accessible to network service consumers, the system comprising:
at least one public network gateway to be operatively coupled to clients of the services network in a public network for providing the services network clients with access to the private services network through the public network to use a network service provided by another client of the services network or to make a network service available in the services network; and
a network controller operatively coupled to the at least one public network gateway and comprising the apparatus of claim 12.

21. The system of claim 20, further comprising:
a client gateway operatively coupled to the services network for providing an access point to the services network for a respective group of services network clients connected to the services network over a private network, each group of services network clients comprising a network service provider, a network service consumer, or both.

22. A method of managing network services of a private services network, the private services network being accessible through a public network, the method comprising:
identifying a network service, provided by a client of the private services network and available in the private services network, having an access policy which allows access to the network service by clients of the services network which connect to the services network over the public network; and
making the identified network service available to clients of the services network through the public network.

23. The method of claim 22, further comprising:
authenticating a client of the services network over the public network; and
allowing the authenticated client to offer, consume, or both offer and consume network services in the services network.

24. The method of claim 23, wherein allowing the authenticated client to offer and consume network services in the services network comprises, respectively:
publishing information associated with network services provided by the authenticated client from a services registry of the authenticated client to the services network; and
publishing information associated with the identified network service from a services registry of the services network to the authenticated client over the public network.

25. A computer-readable medium storing instructions which when executed perform the method of claim 22.

* * * * *